(12) United States Patent
Cheng et al.

(10) Patent No.: US 12,658,528 B2
(45) Date of Patent: Jun. 16, 2026

(54) SEPARATOR AND PREPARATION METHOD THEREFOR, BATTERY, AND ELECTRIC APPARATUS

(71) Applicant: CONTEMPORARY AMPEREX TECHNOLOGY (HONG KONG) LIMITED, Hong Kong (CN)

(72) Inventors: Xiaonan Cheng, Ningde (CN); Haiyi Hong, Ningde (CN); Yanyun Ma, Ningde (CN); Jianrui Yang, Ningde (CN); Yi Zheng, Ningde (CN); Chengdong Sun, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 77 days.

(21) Appl. No.: 18/657,806

(22) Filed: May 8, 2024

(65) Prior Publication Data

US 2024/0313352 A1 Sep. 19, 2024

Related U.S. Application Data

(63) Continuation of application No. PCT/CN2023/079397, filed on Mar. 2, 2023.

(30) Foreign Application Priority Data

Mar. 25, 2022 (WO) ................ PCT/CN2022/083171
Dec. 30, 2022 (WO) ................ PCT/CN2022/144349

(51) Int. Cl.
*H01M 50/446* (2021.01)
*H01M 50/403* (2021.01)
(Continued)

(52) U.S. Cl.
CPC ....... *H01M 50/446* (2021.01); *H01M 50/403* (2021.01); *H01M 50/42* (2021.01);
(Continued)

(58) Field of Classification Search
CPC .......................... H01M 50/446; H01M 50/483
See application file for complete search history.

(56) References Cited

U.S. PATENT DOCUMENTS 11,095,000 B2 8/2021 Akiike
2005/0100794 A1 5/2005 Chamberlain, II et al.
(Continued)

FOREIGN PATENT DOCUMENTS

CN 102334215 A 1/2012
CN 102640329 A 8/2012
(Continued)

OTHER PUBLICATIONS

The Decision to Grant a Patent of counterpart JP application 2023-570404, mailed Jun. 3, 2025, 5 pages with English translation.
(Continued)

*Primary Examiner* — Maria Laios
*Assistant Examiner* — Benjamin T Lustgraaf
(74) *Attorney, Agent, or Firm* — K&L Gates LLP

(57) ABSTRACT

This application discloses a separator and a preparation method therefor, a battery, and an electric apparatus. The separator includes a substrate and a pressure-sensitive coating, where the pressure-sensitive coating is formed on at least a portion of surface of the substrate. The pressure-sensitive coating includes composite particles and a first plasticizer. The composite particles form bulges on surface of the coating, and the composite particles include polyacrylate particles and inorganic particles. The inorganic particle is present between at least two of the polyacrylate particles, and solubility parameter of the first plasticizer and solubility
(Continued)

parameter of the composite particles have a difference with an absolute value of 0.3 MPa$^{1/2}$-4 MPa$^{1/2}$.

34 Claims, 3 Drawing Sheets

(51) Int. Cl.

| | |
|---|---|
| *H01M 50/42* | (2021.01) |
| *H01M 50/434* | (2021.01) |
| *H01M 50/443* | (2021.01) |
| *H01M 50/451* | (2021.01) |
| *H01M 50/489* | (2021.01) |
| *H01M 50/494* | (2021.01) |

(52) U.S. Cl.
CPC ....... *H01M 50/434* (2021.01); *H01M 50/443* (2021.01); *H01M 50/451* (2021.01); *H01M 50/489* (2021.01); *H01M 50/494* (2021.01); *H01M 2220/20* (2013.01)

(56) References Cited

U.S. PATENT DOCUMENTS

| | | | |
|---|---|---|---|
| 2006/0058462 A1 | 3/2006 | Kim et al. | |
| 2007/0264577 A1 | 11/2007 | Katayama et al. | |
| 2014/0038048 A1 | 2/2014 | Chung et al. | |
| 2014/0239239 A1 | 8/2014 | Cha et al. | |
| 2015/0056491 A1* | 2/2015 | Zhao ................... | H01M 50/451 |
| | | | 429/144 |
| 2015/0171396 A1 | 6/2015 | Okuno | |
| 2016/0293999 A1 | 10/2016 | Kim et al. | |
| 2016/0322620 A1* | 11/2016 | Kim ................... | H01M 50/451 |
| 2016/0359156 A1 | 12/2016 | Ohkubo | |
| 2018/0248191 A1 | 8/2018 | Liu et al. | |
| 2020/0067082 A1 | 2/2020 | Nozoe et al. | |
| 2021/0005858 A1 | 1/2021 | Kim et al. | |
| 2021/0028461 A1 | 1/2021 | Kim et al. | |
| 2021/0234233 A1 | 7/2021 | Fan | |
| 2022/0204815 A1 | 6/2022 | Youn et al. | |
| 2022/0231378 A1* | 7/2022 | Annaka ............... | H01M 50/443 |

FOREIGN PATENT DOCUMENTS

| | | | |
|---|---|---|---|
| CN | 102893427 A | 1/2013 | |
| CN | 103441230 A | 12/2013 | |
| CN | 103509500 A | 1/2014 | |
| CN | 104064709 A | 9/2014 | |
| CN | 104335401 A | 2/2015 | |
| CN | 104769753 A | 7/2015 | |
| CN | 104798231 A | 7/2015 | |
| CN | 105047845 A | 11/2015 | |
| CN | 105778834 A | 7/2016 | |
| CN | 105958000 A | 9/2016 | |
| CN | 106519872 A | 3/2017 | |
| CN | 108987751 A | 12/2018 | |
| CN | 109004164 A | 12/2018 | |
| CN | 106928798 B | 4/2019 | |
| CN | 109742290 A | 5/2019 | |
| CN | 109796554 A | 5/2019 | |
| CN | 109841784 A | 6/2019 | |
| CN | 110112353 A | 8/2019 | |
| CN | 110233223 A | 9/2019 | |
| CN | 209929388 U | 1/2020 | |
| CN | 110859053 A | 3/2020 | |
| CN | 111100523 A | 5/2020 | |
| CN | 111653717 A | 9/2020 | |
| CN | 111916624 A | 11/2020 | |
| CN | 111954943 A | 11/2020 | |
| CN | 112142995 A | 12/2020 | |
| CN | 112341961 A | 2/2021 | |
| CN | 112563663 A | 3/2021 | |
| CN | 112920747 A | 6/2021 | |
| CN | 112940650 A | 6/2021 | |
| CN | 113130843 A | 7/2021 | |
| CN | 113140703 A | 7/2021 | |
| CN | 113224466 A | 8/2021 | |
| CN | 113410576 A | 9/2021 | |
| CN | 113583532 A | 11/2021 | |
| CN | 114094274 A | 2/2022 | |
| CN | 115260403 A | 11/2022 | |
| CN | 115466359 A | 12/2022 | |
| CN | 116804139 A | 9/2023 | |
| DE | 2261754 A1 | 6/1974 | |
| EP | 3024062 A1 | 5/2016 | |
| EP | 4152509 A1 | 3/2023 | |
| JP | 2007294437 A | 11/2007 | |
| JP | 2008004441 A | 1/2008 | |
| JP | 2008041581 A | 2/2008 | |
| JP | 2011028883 A | 2/2011 | |
| JP | 2011512005 A | 4/2011 | |
| JP | 2013522843 A | 6/2013 | |
| JP | 2015028842 A | 2/2015 | |
| JP | 2015185530 A | 10/2015 | |
| JP | 2016072142 A | 5/2016 | |
| JP | 2016072155 A | 5/2016 | |
| JP | 2016119220 A | 6/2016 | |
| JP | 2017027945 A | 2/2017 | |
| JP | 2017098204 A | 6/2017 | |
| JP | 2018527710 A | 9/2018 | |
| JP | 2019153557 A | 9/2019 | |
| JP | 2019160792 A | 9/2019 | |
| JP | 2021501453 A | 1/2021 | |
| JP | 2022002173 A | 1/2022 | |
| JP | 2022025186 A | 2/2022 | |
| KR | 20110121690 A | 11/2011 | |
| KR | 20110129476 A | 12/2011 | |
| KR | 20130090437 A | 8/2013 | |
| KR | 20130092439 A | 8/2013 | |
| KR | 20140106301 A | 9/2014 | |
| KR | 20140124321 A * | 10/2014 | .......... H01M 50/489 |
| KR | 20140125352 A | 10/2014 | |
| KR | 20170023605 A | 3/2017 | |
| KR | 20190102572 A | 9/2019 | |
| KR | 20190131503 A | 11/2019 | |
| KR | 20210042404 A | 4/2021 | |
| KR | 20220011097 A | 1/2022 | |
| KR | 20220130229 A | 9/2022 | |
| WO | 2007072948 A1 | 6/2007 | |
| WO | 2010098380 A1 | 9/2010 | |
| WO | 2013108511 A1 | 7/2013 | |
| WO | 2015076066 A1 | 5/2015 | |
| WO | 2020246394 A1 | 12/2020 | |
| WO | 2021085144 A1 | 5/2021 | |
| WO | 2021200649 A1 | 10/2021 | |
| WO | 2021206431 A1 | 10/2021 | |
| WO | 2022019572 A1 | 1/2022 | |
| WO | 2022110223 A1 | 6/2022 | |
| WO | 2022114228 A1 | 6/2022 | |
| WO | 2022120654 A1 | 6/2022 | |
| WO | 2022262210 A1 | 12/2022 | |

OTHER PUBLICATIONS

The Decision to Grant a Patent of counterpart JP application 2023-570405, mailed Jun. 3, 2025, 6 pages with English translation.
The Notice of Reasons for Refusal of counterpart JP application 2023-570444, mailed Apr. 15, 2025, 7 pages with English translation.
The Decision of Refusal of counterpart JP application 2023-567203, mailed May 7, 2025, 7 pages with English translation.
The Request for the Submission of an Opinion of counterpart KR application 10-2023-7038616, mailed Jul. 3, 2025, 15 pages with English translation.
The first notice of examination opinions of counterpart CN application 202310132188.4, mailed Sep. 18, 2025, 9 pages with English translation.
The extended European search report of counterpart EP application 23773499.1, mailed Oct. 14, 2025, 8 pages.
The Decision to Grant a Patent of counterpart JP application 2023-570444, mailed Jul. 16, 2025, 5 pages with English translation.

(56) References Cited

OTHER PUBLICATIONS

The Notice of Reasons for Refusal of counterpart JP application 2023-570171, mailed Aug. 27, 2025, 19 pages with English translation.

The Decision to Grant a Patent of counterpart JP application 2023-506254, mailed Sep. 8, 2025, 5 pages with English translation.

Request for the Submission of an Opinion of counterpart KR application 10-2023-7039011, mailed Jul. 22, 2025, 13 pages with English translation.

Request for the Submission of an Opinion of counterpart KR application 10-2023-7039075, mailed Aug. 6, 2025, 30 pages with English translation.

Request for the Submission of an Opinion of counterpart KR application 10-2023-7039177, mailed Jul. 22, 2025, 14 pages with English translation.

Request for the Submission of an Opinion of counterpart KR application 10-2023-7003322, mailed Aug. 19, 2025, 22 pages with English translation.

The extended European search report of counterpart EU application 22908815.8, mailed Jan. 20, 2025, 8 pages.

The extended European search report of counterpart EU application 23774023.8, mailed Nov. 8, 2024, 8 pages.

The extended European search report of counterpart EU application 23847633.7, mailed Feb. 25, 2025, 7 pages.

The second Office Action of counterpart EU application 22932751.5, mailed Jan. 17, 2025, 2 pages.

The extended European search report of counterpart EU application 23773622.8, mailed Sep. 30, 2024, 4 pages.

The Notice of Reasons for Refusal of counterpart JP application 2023-567203, mailed Oct. 15, 2024, 10 pages with the English translation.

The Notice of Reasons for Refusal of counterpart JP application 2023-570404, mailed Nov. 20, 2024, 8 pages with the English translation.

The Notice of Reasons for Refusal of counterpart JP application 2023-570404, mailed Feb. 4, 2025, 4 pages with the English translation.

The Notice of Reasons for Refusal of counterpart JP application 2023-570405, mailed Jan. 7, 2025, 12 pages with the English translation.

The Notice of Reasons for Refusal of counterpart JP application 2023-570444, mailed Jan. 7, 2025, 6 pages with the English translation.

The Notice of Reasons for Refusal of counterpart JP application 2024-506254, mailed Mar. 18, 2025, 5 pages with the English translation.

The extended European search report received in the counterpart European application 22932751.5, mailed on Jun. 27, 2024.

The International Search Report received in the corresponding international application PCT/CN2023/075964, mailed on May 24, 2023.

The written opinion of ISA received in the corresponding international application PCT/CN2023/075964, mailed on May 24, 2023.

The International Search Report received in the corresponding international application PCT/CN2023/080602, mailed on May 30, 2023.

The written opinion of ISA received in the corresponding international application PCT/CN2023/080602, mailed on May 30, 2023.

The International Search Report received in the corresponding international application PCT/CN2023/083849, mailed on Jul. 11, 2023.

The written opinion of ISA received in the corresponding international application PCT/CN2023/083849, mailed on Jul. 11, 2023.

The International Search Report received in the corresponding international application PCT/CN2023/098414, mailed on Sep. 26, 2023.

The written opinion of ISA received in the corresponding international application PCT/CN2023/098414, mailed on Sep. 26, 2023.

The International Search Report received in the corresponding international application PCT/CN2023/070306, mailed on Apr. 11, 2024.

The written opinion of ISA received in the corresponding international application PCT/CN2023/070306, mailed on Apr. 11, 2024.

The written opinion of ISA received in the corresponding international application PCT/CN2022/083171, mailed on Dec. 14, 2022.

The International Search Report received in the corresponding international application PCT/CN2022/144349, mailed on Aug. 23, 2023.

The written opinion of ISA received in the corresponding international application PCT/CN2022/144349, mailed on Aug. 23, 2023.

International Search Report received in the corresponding international application PCT/CN2023/079397, mailed May 31, 2023.

The written opinion of ISA received in the corresponding international application PCT/CN2023/079397, mailed May 31, 2023.

International Search Report received in the corresponding international application PCT/CN2022/083171, mailed Dec. 14, 2022.

Notice of Allowance (with English Machine Translation), mailed Nov. 4, 2025, for Japanese Patent Application Serial No. 2023-567203.

Office Action (with English Machine Translation), mailed Dec. 11, 2025, for Chinese Patent Application Serial No. 202280030673.4.

Office Action (with English Machine Translation), mailed Dec. 8, 2025, for Korean Patent Application Serial No. 10-2024-7003322.

Office Action (with English Machine Translation), mailed Dec. 15, 2025, for Korean Patent Application Serial No. 10-2023-7039011.

Office Action (with English Machine Translation), mailed Dec. 4, 2025, for Korean Patent Application Serial No. 10-2023-7038616.

Office Action (with English Machine Translation), mailed Jan. 14, 2026, for Korean Patent Application Serial No. 10-2024-7001256.

The First Office Action, mailed Mar. 17, 2026, for European Patent Application Serial No. 22932751.5.

The extended European search report, mailed Mar. 23, 2026, for European Patent Application Serial No. 24738481.1.

The Notice of Reasons for Refusal (with English Machine Translation), mailed Feb. 16, 2026, for Japanese Patent Application Serial No. 2023-570171.

The Notice of Reasons for Refusal (with English Machine Translation), mailed Apr. 7, 2026, for Japanese Patent Application Serial No. 2025-522730.

The Notice of Final Rejection (with English Machine Translation), mailed Apr. 30, 2026, for Korean Patent Application Serial No. 10-2024-7001256.

The Written Decision on Registration (with English Machine Translation), mailed Mar. 24, 2026, for Korean Patent Application Serial No. 10-2023-7038616.

The Written Decision on Registration (with English Machine Translation), mailed Mar. 31, 2026, for Korean Patent Application Serial No. 10-2023-7039011.

The Notice of Final Rejection (with English Machine Translation), mailed Apr. 28, 2026, for Korean Patent Application Serial No. 10-2023-7039075.

The Written Decision on Registration (with English Machine Translation), mailed Mar. 17, 2026, for Korean Patent Application Serial No. 10-2024-7003322.

* cited by examiner

Corner

First plasticizer

Composite/organic particle

Composite/ organic particle

Emulsifier

Binder

Substrate

1

2

3

SEPARATOR AND PREPARATION METHOD THEREFOR, BATTERY, AND ELECTRIC APPARATUS

CROSS REFERENCE TO RELATED APPLICATION

The present application is a continuation of International Patent Application No. PCT/CN2023/079397, filed on Mar. 2, 2023, which claims priority to International Patent Application No. PCT/CN2022/083171, filed on Mar. 25, 2022, and also claims priority to International Patent Application No. PCT/CN2022/144349, filed on Dec. 30, 2022, the contents of which are incorporated herein by reference.

TECHNICAL FIELD

This application pertains to the technical field of secondary batteries, and specifically relates to a separator and a preparation method therefor, a battery, and an electric apparatus.

BACKGROUND

In the process of manufacturing cells of electrochemical devices, displacement of the electrode plates and separator during a transfer process is inevitable. Minor displacement can cause the electrode plates to contact each other, resulting in the scrapping of dry cells. Severe displacement can cause the electrode plates to wrinkle after full charge, significantly affecting the kinetic performance and degrading the safety performance of the cell. Therefore, an adhesive coating is currently applied to the separator, and during the first composite process of the electrode plates and separator of the electrochemical device, pre-pressing is usually performed under appropriate pressure to ensure that the electrode plates and separator of the electrochemical device have some adhesion before entering the next process. However, due to production efficiency requirements, the pressure and acting duration at this stage cannot fully meet the needs for the electrode plates and separator of the electrochemical device to achieve appropriate adhesion.

SUMMARY

In view of the technical issue existing in the background technology, this application provides a separator, aiming to meet the need for the electrode plates and separator of an electrochemical device to achieve appropriate adhesion under different pressures.

To achieve the above purpose, a first aspect of this application provides a separator including a substrate and a pressure-sensitive coating, where the pressure-sensitive coating is formed on at least a portion of surface of the substrate, and the pressure-sensitive coating includes composite particles and a first plasticizer, the composite particles form bulges on surface of the pressure-sensitive coating, and the composite particles include polyacrylate particles and inorganic particles, where the inorganic particle is present between at least two of the polyacrylate particles, and solubility parameter of the first plasticizer and solubility parameter of the composite particles have a difference with an absolute value of 0.3 $MPa^{1/2}$-4 $MPa^{1/2}$.

Compared with the prior art, this application has the following beneficial effects: the separator has good pressure sensitivity and compressive modulus. Its adhesion force is below 0.1 N/m at ≤1 MPa, thus avoiding adhesion between layers of the separator during roll winding and storage. At ≥2 MPa pressure, the separator can exhibit significant adhesion to the electrode plates, and thus when the separator is used to prepare a cell, the electrode plates and the separator can be tightly bonded under appropriate pressure at room temperature, thereby improving the kinetic performance of the cell.

In some embodiments of this application, the first plasticizer includes an ester compound, and solubility parameter of the ester compound is 12 $MPa^{1/2}$-30 $MPa^{1/2}$. Thus, the solubility of the composite particles can be reduced while the pressure sensitivity of the pressure-sensitive coating is improved.

In some embodiments of this application, the pressure-sensitive coating further includes an emulsifier, the emulsifier including at least one of an anionic emulsifier and a nonionic emulsifier. This facilitates the uniform distribution of the first plasticizer in the composite particles, further improving the yield rate of separator production and the pressure sensitivity of the separator.

In some embodiments of this application, the pressure-sensitive coating includes 80-96 parts by weight of composite particles, 5-30 parts by weight of ester compound, and 0.1-0.5 parts by weight of emulsifier. Thus, the separator has good pressure sensitivity, thereby improving the kinetic performance of the cell.

In some embodiments of this application, $D_v50$ of the composite particles is ≥2.5 μm, preferably 2.5 μm-10 μm, and more preferably 3 μm-8 μm. This helps form a bulge structure on the surface of the pressure-sensitive coating, thereby improving the kinetic performance of the cell.

In some embodiments of this application, the composite particles include a first agglomerate, and the first agglomerate includes at least two of the inorganic particles. Thus, the kinetic performance of the cell can be improved.

In some embodiments of this application, 0.01 μm≤$D_v50$ of the first agglomerate ≤$D_v10$ of the composite particles. Thus, the compressive modulus of the separator can be increased.

In some embodiments of this application, the composite particles include inorganic particles of primary particle morphology.

In some embodiments of this application, $D_v50$ of the inorganic particles of primary particle morphology is 0.01 μm-1 μm, preferably 0.5 μm-1 μm. Thus, it can be ensured that the composite particles are not fused during preparation to block the ion transport channels of the separator.

In some embodiments of this application, the composite particles include a second agglomerate, and the second agglomerate includes at least two of the polyacrylate particles.

In some embodiments of this application, $D_v50$ of the second agglomerate is 0.3 μm-5 μm, preferably 1 μm-2 μm.

In some embodiments of this application, the polyacrylate particles include polyacrylate particles of primary particle morphology and/or polyacrylate particles of secondary particle morphology.

In some embodiments of this application, $D_v50$ of the polyacrylate particles of primary particle morphology is 50 nm-400 nm, preferably 100 nm-200 nm. Thus, overall ionic conductivity of the pressure-sensitive coating of the separator can be improved, the resistance of the separator can be reduced, and the kinetic performance of the cell can be improved.

In some embodiments of this application, $D_v50$ of the polyacrylate particles of secondary particle morphology is 2 μm-15 μm, preferably 5 μm-8 μm. Thus, a buffer space can be provided for stress release between the electrode plates, preventing corners of a wound cell from breaking due to stress accumulation.

In some embodiments of this application, percentage of the inorganic particles in the composite particles is 1 wt %-50 wt %, optionally 1 wt %-40 wt %, more optionally 2 wt %-15 wt %, and most preferably 5 wt %-15 wt %. Thus, the separator obtains appropriate compressive modulus.

In some embodiments of this application, two-side height of the bulges is 15 µm-60 µm. Thus, the safety performance of the battery can be improved and the kinetic performance of the cell can be also improved.

In some embodiments of this application, the first agglomerate is present on surface of the bulges. Thus, the kinetic performance of the battery can be improved.

In some embodiments of this application, the polyacrylate particles have a glass transition temperature of 20° C.-80° C., preferably 25° C.-65° C. This can avoid the adhesion of composite particles during high-temperature granulation and improve the ionic conductivity of the separator.

In some embodiments of this application, the pressure-sensitive coating further includes 4-20 parts by weight of pressure-sensitive adhesive polymer, the pressure-sensitive adhesive polymer including an adhesive polymer and a second plasticizer. Thus, the pressure sensitivity of the separator can be further improved, and the kinetic performance of the cell can be improved.

In some embodiments of this application, average particle size of the adhesive polymer is 0.5 µm-3.0 µm, optionally 0.8 µm-2.0 µm. This is conducive to the uniform distribution of the pressure-sensitive adhesive polymer among the composite particles and improves the pressure sensitivity of the separator.

In some embodiments of this application, DSC melting point of the pressure-sensitive adhesive polymer is −50° C.-100° C., optionally −45° C.-60° C. With the DSC melting point of the pressure-sensitive adhesive polymer within the above range, the adhesive strength at room temperature can be ensured, avoiding excessive adhesive force causing bonding of the separator during roll winding under 1 MPa, and avoiding small adhesive force causing weak bonding between the separator and the electrode plates at room temperature under 2 MPa, which is not conducive to the shaping of the cell.

In some embodiments of this application, mass ratio of the adhesive polymer to the second plasticizer is (4-19):1, optionally (4-11):1. With the relative ratio of the adhesive polymer to the second plasticizer within the above range, it can be ensured that the electrode plates and the separator obtain a large adhesive force under certain pressure, without increasing the resistance of the separator or decreasing the cycling performance of the battery.

In some embodiments of this application, the pressure-sensitive adhesive polymer is a core-shell structure, and both core and shell of the core-shell structure include an adhesive polymer and a second plasticizer, where in the core structure, mass ratio of the adhesive polymer to the second plasticizer is (2-5):1, optionally (3-4):1; and in the shell structure, mass ratio of the adhesive polymer to the second plasticizer is (6-10):1, optionally (7-9):1. This can further improve the pressure sensitivity of the pressure-sensitive adhesive polymer and further enhance the kinetic performance of the cell.

In some embodiments of this application, the adhesive polymer includes a copolymer formed by at least one of the following first monomers, at least one of the following second monomers, at least one of the following third monomers, and reactive monomers of at least one of the following reactive dispersants:

first monomers, including acrylic acid, methacrylic acid, methyl methacrylate, tert-butyl methacrylate, isobornyl methacrylate, methylol acrylamide, acrylamide, styrene, and acrylonitrile;

second monomers, including $C_4$-$C_{22}$ alkyl acrylate, isobutyl acrylate, isooctyl acrylate, tert-butyl acrylate, 2-ethylhexyl acrylate (isooctyl), cyclohexyl acrylate, ethyl methacrylate, methyl Isobutyl acrylate, 2-ethylhexyl methacrylate, n-hexyl methacrylate, cyclohexyl methacrylate, benzyl methacrylate, 2-hydroxyethyl acrylate, 2-hydroxypropyl acrylate, ethylene urea ethyl methacrylate, dicyclopentene ethoxy methacrylate, dimethylaminoethyl methacrylate, diethyl methacrylate amino ethyl ester, ethylene urea ethyl methacrylate, propylene methacrylate, dicyclopentene ethoxy methacrylate, tetrahydrofuryl methacrylate, and trifluoroethyl methacrylate;

third monomers, including 2-hydroxyethyl methacrylate, 2-hydroxypropyl methacrylate, methacrylate-2-hydroxyethyl ester, 2-hydroxypropyl methacrylate, glycidyl acrylate, glycidyl methacrylate, dimethylaminoethyl methacrylate, diethylaminoethyl methacrylate, vinyltrimethoxysilane, vinyltriethoxysilane, vinyl triisopropoxysilane, methacryloxypropyltrimethoxysilane, N-methylolacrylamide, N-butoxymethyl(meth) acrylamide, diacetoneacrylamide, ethyl methacrylate acetoacetate, divinylbenzene, epoxy resin with an epoxy value of 0.35-0.50, and divinylbenzene; and reactive dispersants, including polyvinyl alcohol, polypropylene alcohol, polypropylene glycol, polyethylene glycol, and polyvinyl acid alcohol.

This can ensure that the adhesive polymer has suitable swelling and adhesion, and the pressure-sensitive adhesive polymer has suitable swelling, pressure sensitivity, and adhesion properties, as well as a suitable elastic modulus, ensuring the shaping effect, kinetic performance, and safety performance of the cell.

In some embodiments of this application, the second plasticizer includes at least one of glycerol $C_4$-$C_{10}$ alkyl diether, glycerol $C_4$-$C_{10}$ alkyl ether, glycerol $C_4$-$C_{10}$ carboxylic acid monoester, glycerol $C_4$-$C_{10}$ carboxylic acid diester, propylene glycol $C_4$-$C_{10}$ alkyl ether, and glycerol.

In some embodiments of this application, the pressure-sensitive coating further includes organic particles, the organic particles include at least one of polytetrafluoroethylene particles, polychlorotrifluoroethylene particles, polyvinyl fluoride particles, polyvinylidene fluoride particles, polyethylene particles, polypropylene particles, polyacrylonitrile particles, polyethylene oxide particles, copolymer particles of fluorine-containing alkenyl monomer units and vinyl monomer units, copolymer particles of fluorine-containing alkenyl monomer units and acrylate monomer units, copolymer particles of fluorine-containing alkenyl monomer units and acrylic monomer units, and modified compound particles of the homopolymers or copolymers; and the organic particles and the composite particles form the bulges on the surface of the coating. Thus, the cycling performance and safety performance of the cell can be improved.

In some embodiments of this application, the organic particles form a third agglomerate.

In some embodiments of this application, $D_v50$ of the third agglomerate is 5 µm-30 µm, preferably 5.0 µm-12 µm.

In some embodiments of this application, the third agglomerate includes organic particles of primary particle morphology, and a gap is present between adjacent two of the organic particles. Thus, the ionic conductivity of the separator can be improved.

In some embodiments of this application, $D_v50$ of the organic particles of primary particle morphology is 50 nm-400 nm, preferably 100 nm-200 nm.

In some embodiments of this application, mass ratio of the composite particles to the organic particles is (20-90):(0-70), preferably (45-90):(0-45). Thus, costs of the battery can be reduced, and the safety performance and cycling performance of the battery can be improved.

In some embodiments of this application, average thickness of the pressure-sensitive coating is 2 μm-20 μm, optionally, 2 μm-15 μm. This can ensure appropriate adhesion between the separator and the electrode plates, improving the kinetic performance of the cell.

A second aspect of this application provides a method for preparing separator, including the following steps: forming a pressure-sensitive coating on at least a portion of surface of a substrate, where the pressure-sensitive coating includes composite particles and a first plasticizer, the composite particles form bulges on surface of the pressure-sensitive coating, and the composite particles include polyacrylate particles and inorganic particles, where the inorganic particle is present between at least two of the polyacrylate particles, and solubility parameter of the first plasticizer and solubility parameter of the composite particles have a difference with an absolute value of 0.3 $MPa^{1/2}$-4 $MPa^{1/2}$.

As a result, the separator of this application has good pressure sensitivity and compressive modulus. Its adhesion force is below 0.1 N/m at ≤1 MPa, thus avoiding adhesion between layers of the separator during roll winding and storage. At ≥2 MPa pressure, the separator can exhibit significant adhesion to the electrode plates, and thus when the separator is used to prepare a cell, the electrode plates and the separator can be tightly bonded under appropriate pressure at room temperature, thereby improving the kinetic performance of the cell.

A third aspect of this application provides a battery including the separator according to the first aspect of this application or a separator prepared by using the method according to the second aspect of this application.

A fourth aspect of this application provides an electric apparatus, including the battery according to the third aspect of this application, where the battery is configured to supply electrical energy. The electric apparatus in this application uses the battery provided above in this application, and therefore has at least the same advantages as the battery.

BRIEF DESCRIPTION OF DRAWINGS

To describe the technical solutions in this application more clearly, the following briefly describes the accompanying drawings used in this application. Apparently, the accompanying drawings in the following descriptions show only some embodiments of this application, and a person of ordinary skill in the art may still derive other drawings from these accompanying drawings without creative efforts.

6

Figure 4:
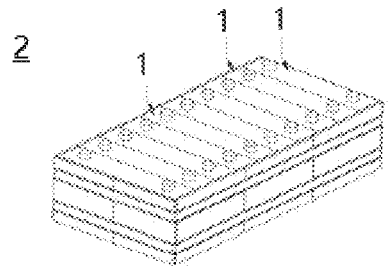

FIG. 4 is a schematic structural diagram of a battery module according to an embodiment of this application.

Figure 5:
Figure 5:
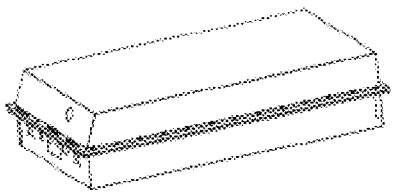

FIG. 5 is a schematic structural diagram of a battery pack according to an embodiment of this application.

Figure 6:
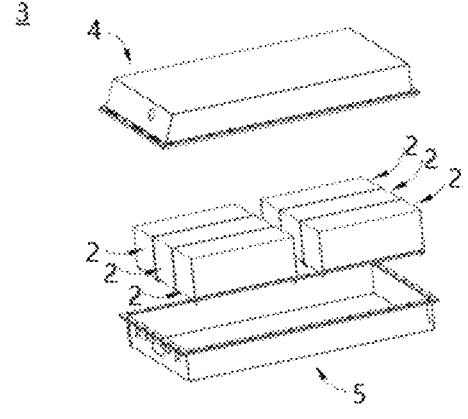

FIG. 6 is an exploded view of FIG. 5.

Figure 7:
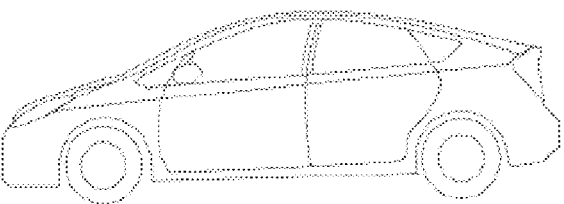

FIG. 7 is a schematic diagram of an embodiment of an electric apparatus using a battery as a power source.

Reference signs are described as follows:

1: secondary battery; 2: battery module; 3: battery pack; 4: upper box body; and 5: lower box body.

DETAILED DESCRIPTION OF EMBODIMENTS

The following further describes this application with reference to specific embodiments. It should be understood that these specific embodiments are merely intended to illustrate this application but not to limit the scope of this application.

For brevity, this specification specifically discloses only some numerical ranges. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, each individually disclosed point or individual single numerical value may itself be a lower limit or an upper limit which ca be combined with any other point or individual numerical value or combined with another lower limit or upper limit to form a range not expressly recorded.

In the description of this specification, unless otherwise stated, the term "or (or)" is inclusive. That is, the phrase "A or (or) B" means "A, B, or both A and B". More specifically, any one of the following conditions satisfies the condition "A or B": A is true (or present) and B is false (or not present); A is false (or not present) and B is true (or present); or both A and B are true (or present).

In the descriptions of this specification, it should be noted that "more than" and "less than" are inclusive of the present number and that "more" in "one or more" means two or more than two, unless otherwise specified.

Unless otherwise specified, the terms used in this application have well known meanings as commonly understood by persons skilled in the art. Unless otherwise specified, numerical values of parameters mentioned in this application may be measured by using various measurement methods commonly used in the art (for example, they may be tested by using the methods provided in the embodiments of this application).

Embodiments of this application provide a separator including a substrate and a pressure-sensitive coating, where the pressure-sensitive coating is formed on at least a portion of surface of the substrate, and the pressure-sensitive coating includes composite particles and a first plasticizer, the composite particles form bulges on surface of the pressure-sensitive coating, and the composite particles include polyacrylate particles and inorganic particles, where the inorganic particle is present between at least two of the polyacrylate particles, and solubility parameter of the first plasticizer and solubility parameter of the composite particles have a difference with an absolute value of 0.3 $MPa^{1/2}$-4 $MPa^{1/2}$.

It should be noted that "the pressure-sensitive coating is formed on at least a portion of surface of the substrate" should be construed as the pressure-sensitive coating being in direct contact with the surface of the substrate, which is referred to as "direct contact"; or another layer being present between the surface of the substrate and the pressure-sensitive coating, which is referred to "indirect contact". In addition, for "the inorganic particle is present between at least two of the polyacrylate particles, and the composite particles form bulges on surface of the pressure-sensitive coating", the separator may be cut along its thickness direction, and then the section of the pressure-sensitive coating of the separator is scanned using a scanning electron microscope (SEM). From the SEM image, it can be seen that the composite particles include polyacrylate particles and inorganic particles, with the inorganic particle present between some of polyacrylate particles and the composite particles forming bulges on the surface of the pressure-sensitive coating.

Specifically, a ZEISS Sigma 300 scanning electron microscope is used for testing. Testing is conducted according to the following steps: first cut a separator under test into 6 mm×6 mm samples for testing, and clamp the sample for testing with two electrically-conductive and thermally-conductive copper foils; attach the sample being tested to the copper foil using a two-side tape, press it with a 400 g flat iron block for 1 hour to make the gap between the sample being tested and the copper foil as small as possible, and cut edges with scissors; and attach it to a sample stage using a conductive adhesive such that the sample slightly protrudes from an edge of the sample stage. Then, load the sample stage into a sample holder and lock the sample stage in place, power on an IB-19500CP argon ion beam cross-section polisher and evacuate the polisher until 10 Pa-4 Pa, set argon flow to 0.15 MPa, voltage to 8 KV, and polishing time to 2 hours, adjust the sample stage to rocking mode to start polishing, and after polishing is completed, use the ZEISS Sigma 300 scanning electron microscope to obtain an ion beam cross-section polisher (CP) image of the sample being tested.

Without any wish to be bound by any theory, the inventors have found through extensive research that the pressure-sensitive coating of the separator used in this application includes composite particles and a first plasticizer, where the composite particles include polyacrylate particles and inorganic particles, and the inorganic particle is present between at least two of the polyacrylate particles, thereby avoiding adhesion of the composite particles during high-temperature granulation. This improves ionic conductivity of the separator, and improves compressive modulus of the composite particles, implementing appropriate adhesion between the separator and the electrode plates. Compared with use of polyvinylidene fluoride particles for the coating of existing separators, the coating of the separator in this application includes composite particles and a first plasticizer, which reduces resistance of the separator. In addition, with the solubility parameter of the first plasticizer and the solubility parameter of the composite particles having a difference with an absolute value of 0.3 $MPa^{1/2}$-4 $MPa^{1/2}$, the first plasticizer can plasticize the composite particles, thus improving the pressure sensitivity of the separator and improving the kinetic performance of the cell. Moreover, appropriate adhesion is implemented between the separator and the electrode plates during production and use of the cell. Most importantly, this makes the separator have appropriate compressive modulus, so as to ensure that lithium ion transport channels are not blocked when the cell experiences an increasing swelling force during cycling to deteriorate kinetic performance, thereby improving the kinetic performance of the battery. In addition, when high temperature is generated due to thermal runaway of the battery, the bulges formed by the composite particles on the surface of the coating can form a large-area film structure to reduce or block the ion transport channels and delay thermal spread of the battery, thereby effectively improving the cycling performance and high-temperature safety performance of the battery. As a result, the separator of this application has good pressure sensitivity and compressive modulus. Its adhesion force is below 0.1 N/m at ≤1 MPa, thus avoiding adhesion between layers of the separator during roll winding and storage. At ≥2 MPa pressure, the separator can exhibit significant adhesion to the electrode plates, and thus when the separator is used to prepare a cell, the electrode plates and the separator can be tightly bonded under appropriate pressure at room temperature, thereby improving the kinetic performance of the cell.

The inventors have found through in-depth research that when the separator in this application satisfies the foregoing conditions, the performance of the battery can be further improved if one or more of the following conditions are also satisfied optionally.

In some embodiments, solubility parameter of the first plasticizer and solubility parameter of the composite particles have a difference with an absolute value of 0.3 $MPa^{1/2}$-4 $MPa^{1/2}$, for example, 0.4 $MPa^{1/2}$-3.8 $MPa^{1/2}$, 0.5 $MPa^{1/2}$-3.6 $MPa^{1/2}$, 0.7 $MPa^{1/2}$-3.5 $MPa^{1/2}$, 0.9 $MPa^{1/2}$-3.2 $MPa^{1/2}$, 1 $MPa^{1/2}$-3 $MPa^{1/2}$, 1.2 $MPa^{1/2}$-2.8 $MPa^{1/2}$, 1.5 $MPa^{1/2}$-2.5 $MPa^{1/2}$, 1.8 $MPa^{1/2}$-2.2 $MPa^{1/2}$, 2 $MPa^{1/2}$-2.2 $MPa^{1/2}$. The inventors have found that if the solubility parameter of the first plasticizer is too different from that of the composite particles (more than 4 $MPa^{1/2}$), the plasticizing effect of the first plasticizer on the composite particles is small, and if the solubility parameter of the first plasticizer is too close to that of the composite particles (less than 0.3 $MPa^{1/2}$), the composite particles are easy to dissolve, causing adhesion during storage of the separator, and even agglomeration of the slurry during coating, resulting in production difficulties. Therefore, using a first plasticizer whose solubility parameter satisfies the above difference with the solubility parameter of the composite particles can ensure the plasticizing effect of the first plasticizer on the composite particles, thereby improving the pressure sensitivity of the separator and the kinetic performance of the cell.

According to some examples, the solubility parameter SP of the first plasticizer=$(E/V)^{1/2}$, where E is the cohesive energy, in units of J, V is the volume, in units of $m^3$, E/V is the cohesive energy density. There are many methods for measuring cohesive energy density. For example, the boiling point of the substance can be measured, and the empirical formula $\Delta H = -2950 + 23.7\,T_b + 0.02\,T_b^2$ for the boiling point $T_b$ and the vaporization heat $\Delta H$ at room temperature can be used. According to the following formula, the solubility parameter can be further obtained: $SP = (E/V)^{1/2} = ((\Delta H - RT)/V_m)^{1/2}$, where R is a gas constant with a value of 8.31 J/(mol·K), T is the room temperature in K, $V_m$ is the molar liquid volume of the first plasticizer at room temperature ($m^3$/mol), and T is a room temperature (K).

The solubility parameter of the composite particles is equal to the solubility parameter of the polyacrylate particles. The solubility parameter SP of the polyacrylate particles can be obtained by querying the solubility parameter of the monodisperse polymers of the polyacrylate particles. If the polyacrylate particles include multiple types of monomers, the solubility parameter can be obtained as the square root of the sum of products of monomer mass ratio times the square of the solubility parameter of the respective monodisperse polymer. For example, if the polyacrylate includes three types of monomers A, B, and C, the mass ratio of monomer A is a, and the solubility parameter of the monodisperse polymer of monomer A is $SP_a$; the mass ratio of monomer B is b, and the solubility parameter of the monodisperse polymer of monomer B is $SP_b$; the mass ratio of monomer C is c, and the solubility parameter of the monodisperse polymer of monomer C is $SP_c$, then the solubility parameter SP of the polyacrylate particles= $(a*SP_a^2+b*SP_b^2+c*SP_c^2)^{1/2}$.

In some embodiments, the first plasticizer includes an ester compound, and the solubility parameter of the ester compound is 12 $MPa^{1/2}$-30 $MPa^{1/2}$, for example, 13 $MPa^{1/2}$-29 $MPa^{1/2}$, 14 $MPa^{1/2}$-28 $MPa^{1/2}$, 15 $MPa^{1/2}$-27 $MPa^{1/2}$, 16 $MPa^{1/2}$-26 $MPa^{1/2}$, 17 $MPa^{1/2}$-25 $MPa^{1/2}$, 18 $MPa^{1/2}$-24 $MPa^{1/2}$, 19 $MPa^{1/2}$-23 $MPa^{1/2}$, or 20 $MPa^{1/2}$-22 $MPa^{1/2}$. This can achieve a plasticizing effect on the composite particles and improve the pressure sensitivity of the separator. As an example, the ester compound includes but is not limited to carbonate compounds, carboxylic acid ester compounds, lactone compounds, etc., such as ethylene carbonate, propylene carbonate, methyl ethyl carbonate, ethyl acetate, propyl acetate, butyl acetate, caprolactone, diethylene glycol butyl ether acetate, and the like.

In some embodiment, the pressure-sensitive coating further includes an emulsifier, the emulsifier including at least one of an anionic emulsifier and a nonionic emulsifier. The addition of emulsifier can make ester compound evenly distributed in the composite particles, further improving the pressure sensitivity and production efficiency of the separator. As an example, anionic emulsifiers include alkyl benzene sulfonates; nonionic emulsifiers include fatty alcohol polyoxyethylene ethers, alkylphenol polyoxyethylene ethers, fatty acid polyoxyethylene ethers, glycerol esters, and one or more polyglycerol stearates.

In some embodiments, the pressure-sensitive coating includes 80-96 parts by weight of composite particles, 5-30 parts by weight of ester compound, and 0.1-0.5 parts by weight of emulsifier, for example, 82-94 parts by weight of composite particles, 84-92 parts by weight of composite particles, 86-90 parts by weight of composite particles, 88-90 parts by weight of composite particles; 6-28 parts by weight of ester compound, 8-26 parts by weight of ester compound, 10-25 parts by weight of ester compound, 12-22 parts by weight of ester compound, 15-20 parts by weight of ester compound, 15-18 parts by weight of ester compound; 0.2-0.5 parts by weight of emulsifier, 0.3-0.5 parts by weight of emulsifier, and 0.4-0.5 parts by weight of emulsifier. Therefore, when the composite particles, ester compound, and emulsifier in the pressure-sensitive coating use the above composition, the pressure sensitivity of the pressure-sensitive coating can be further improved, and the adhesion between the separator and the electrode can be suitable, thereby improving the kinetic performance of the cell.

According to an example, preparation of the composite particles of this application may be conducted according to the following steps:

(1) provide polymer monomers for preparing polyacrylate particles, and polymerize the polymer monomers to obtain a polyacrylate polymer;

(2) add solvent and inorganic particles to the polyacrylate polymer obtained in step (1), and perform stirring to obtain a mixed slurry; and (3) dry the mixed slurry obtained in step (2) to remove the solvent, and then perform grinding and pulverization to obtain the composite particles described in this application.

It should be noted that polymerization of the polymer monomers may be performed by using a polymerization method commonly used in the art, for example, polymerization may be performed in an emulsion polymerization or suspension polymerization manner.

In some embodiments, in step (1), additives, for example, emulsifier such as sodium lauryl sulfate and polymerization initiator such as ammonium persulfate, may also be added to the polymerization system of polymer monomers.

In some embodiments, in step (1), the polymer monomers for preparing polyacrylate particles include at least the following polymer monomers:

first polymer monomers having at least one ester bond, which is optionally one or more of methyl acrylate, ethyl acrylate, n-propyl acrylate, n-butyl acrylate, isobutyl acrylate, sec-butyl acrylate, tert-butyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, methacrylate-2-hydroxyethyl ester, 2-hydroxypropyl methacrylate, vinyl acetate, trifluoroethyl methacrylate, glycidyl methacrylate, or trimethylolpropane triacrylate; more optionally, one or more of methyl methacrylate, lauryl acrylate, lauryl methacrylate, or trimethylolpropane triacrylate;

second polymer monomers, having at least one cyanide bond, which is optionally one or more of acrylonitrile, methacrylonitrile, and ethacrylonitrile, and more optionally one or more of acrylonitrile and methacrylonitrile; and third polymer monomers having at least one amide bond, which is optionally one or more of acrylamide, N-methylol acrylamide, and N-butoxymethacrylamide, and more optionally one or more of acrylamide and N-methylolacrylamide.

In this way, the polyacrylate particles are polymerized by using at least the above three types of polymer monomers, so that the separator has appropriate adhesion with the electrode plate, improving the kinetic performance of the battery.

In some embodiments, a weight ratio of the first polymer monomer, the second polymer monomer and the third polymer monomer in the polyacrylate particles formed above is 1:0-0.8:0.05-0.75, for example, 1:0.1-0.8:0.05-0.75, 1:0.1-0.7:0.05-0.75, 1:0.2-0.6:0.05-0.75, 1:0.3-0.5:0.05-0.75, 1:0.3-0.4:0.05-0.75, 1:0-0.8:0.05-0.7, 1:0-0.8:0.1-0.7, 1:0-0.8:0.15-0.65, 1:0-0.8:0.2-0.6, 1:0-0.8:0.3-0.5, or 1:0-0.8:0.4. Thus, the kinetic performance of the battery can be improved. In some other embodiments, the weight ratio of the first polymer monomer, the second polymer monomer, and the third polymer monomer in the polyacrylate particles formed above is 1:0.1-0.6:0.1-0.6.

In some embodiments, in step (2), the inorganic particles include one or more of oxides of self-silicon, aluminum, calcium, zinc, and magnesium, as well as one or more of sodium sulfate, sodium benzoate, calcium carbonate, and modified materials thereof. Optionally, one or more of silica, silica sol, alumina, zinc oxide, magnesium oxide, and sodium benzoate may be selected, and more optionally, one or more of gas-phase silica, silicon micro-powder, alumina, and sodium benzoate may be selected.

In some embodiments, in the separator of this application, $D_v50$ of the composite particles is $\geq 2.5$ μm, for example, 2.5 μm-10 μm, 2.5 μm-8 μm, 2.5 μm-6 μm, 2.5 μm-5 μm, 2.5 μm-4 μm, or 2.5 μm-3 μm. In this way, on the one hand, the composite particles satisfying the range of $D_v50$ can provide appropriate adhesion force between the pressure-sensitive coating of the separator and the electrode plate; on the other hand, this helps form a convex structure on the pressure-sensitive coating surface, thereby improving the kinetic performance of the cell.

In some embodiments, in the separator of this application, a first agglomerate is present between the polyacrylate particles, and the first agglomerate includes at least two of the inorganic particles. Therefore, on the one hand, the composite particles are not too soft, so as to ensure proper interaction between the composite particles and the electrode plate as well as between the composite particles and the substrate under swelling of the battery or relatively large external force, thereby improving the kinetic performance of the battery. On the other hand, it can be ensured that the composite particles are not fused during the production process to block the ion transport channels, and when first agglomerates formed by inorganic particles are present inside or on the surface of the composite particles, it is ensured that the quasi-spherical body of the composite particles may not soften and collapse at a high temperature such as ≥45° C. and at a stress state of ≥0.4 MPa. This further ensures proper interaction between the composite particles and the electrode plate, as well as between the composite particles and the substrate, thereby curbing deterioration of cycling performance of the battery and further improving the kinetic performance of the battery.

In some embodiments, 0.01 μm≤$D_v$50 of the first agglomerate ≤$D_v$10 of the composite particles. Thus, the compressive modulus of the separator can be increased.

In some embodiments, in the separator of this application, the composite particles include inorganic particles of primary particle morphology. Further, $D_v$50 of the inorganic particles of primary particle morphology is 0.01 μm-1 μm, for example, 0.01 μm-0.8 μm, 0.05 μm-1 μm, 0.1 μm-1 μm, 0.2 μm-1 μm, 0.3 μm-1 μm, 0.4 μm-1 μm, 0.5 μm-1 μm, 0.6 μm-1 μm, 0.7 μm-1 μm, 0.8 μm-1 μm, or 0.9 μm-1 μm. Thus, the inorganic particles satisfying the $D_v$50 can enable the separator to obtain appropriate compressive modulus, thereby improving the kinetic performance of the battery. In some other embodiments, $D_v$50 of the inorganic particles of primary particle morphology is 0.5 μm-1 μm. In this way, the kinetic performance of the battery can be improved.

It should be noted that the primary particles and secondary particles have meanings known in the art. The primary particles are particles not in an agglomerated state. The secondary particles are particles in an agglomerated state that are formed by accumulating two or more primary particles. The primary particles and the secondary particles can be easily distinguished through scanning electron microscope (SEM) images.

In some embodiments, in the separator of this application, the composite particles include a second agglomerate, and the second agglomerate includes at least two of the polyacrylate particles. Therefore, the composite particles are not too soft, so as to ensure proper interaction between the composite particles and the electrode plate as well as between the composite particles and the substrate of the separator under swelling of the battery or relatively large external force, thereby improving the kinetic performance of the battery. Further, $D_v$50 of the second agglomerate is 0.3 μm-5 μm, for example, 0.5 μm-5 μm, 0.7 μm-4.5 μm, 1 μm-4 μm, 1.3 μm-3.5 μm, 1.5 μm-3.2 μm, 1.7 μm-3 μm, 2 μm-2.8 μm, 2 μm-2.5 μm, 5 μm-10 μm, 5 μm-9 μm, 5 μm-8 μm, 5 μm-7 μm, or 5 μm-6 μm. In some other embodiments, $D_v$50 of the second agglomerate is 1 μm-2 μm.

In some embodiments, in the composite particles of this application, the polyacrylate particles include polyacrylate particles of primary particle morphology and/or polyacrylate particles of secondary particle morphology. $D_v$50 of the polyacrylate particles of primary particle morphology is 50 nm-400 nm, for example, 50 nm-375 nm, 75 nm-375 nm, 100 nm-350 nm, 125 nm-325 nm, 150 nm-300 nm, 175 nm-275 nm, 200 nm-250 nm, or 200 nm-225 nm. In some other embodiments, $D_v$50 of the polyacrylate particles of primary particle morphology is 100 nm-200 nm. $D_v$50 of the polyacrylate particles of secondary particle morphology is 2 μm-15 μm, for example, 3 μm-15 μm, 4 μm-12 μm, 5 μm-10 μm, 5 μm-8 μm, 5 μm-7 μm, or 5 μm-6 μm.

In some embodiments, percentage of the inorganic particles in the composite particles is 1 wt %-50 wt %, for example, 1 wt %-48 wt %, 1 wt %-45 wt %, 1 wt %-40 wt %, 1 wt %-35 wt %, 1 wt %-30 wt %, 1 wt %-25 wt %, 1 wt %-20 wt %, 1 wt %-15 wt %, 2 wt %-15 wt %, 3 wt %-15 wt %, 4 wt %-15 wt %, 5 wt %-15 wt %, 7 wt %-15 wt %, 10 wt %-15 wt %, or 12 wt %-15 wt %. Thus, with the amount of inorganic particles in the composite particles controlled within the above-mentioned range, on the one hand, this prevents the polyacrylate particles from sticking together during the high-temperature granulation, thereby improving the ionic conductivity of the separator. On the other hand, it ensures that the separator has a suitable compressive modulus, which can ensure that the battery module has appropriate action force between the coating of the separator and the anode under the stress state.

In some embodiments, the polyacrylate particles have a glass transition temperature of 20° C.-80° C., for example, 25° C.-75° C., 30° C.-70° C., 35° C.-65° C., 40° C.-60° C., 45° C.-55° C., or 45° C.-50° C. Use of polyacrylate particles having such a glass transition temperature can avoid the adhesion of composite particles during high-temperature granulation and improve the ionic conductivity of the separator. In some other embodiments, the polyacrylate particles have a glass transition temperature of 25° C.-65° C.

In some embodiments, bulges are formed on the coating surface of the separator of this application, the bulges having a two-side height of 15 μm-60 μm, for example, 15 μm-58 μm, 16 μm-56 μm, 18 μm-55 μm, 20 μm-52 μm, 22 μm-40 μm, 25 μm-40 μm, 25 μm-38 μm, 25 μm-36 μm, 28 μm-35 μm, or 30 μm-32 μm. Therefore, on the one hand, the bulges within the height range can provide appropriate space between the separator and the electrode plate to release stress, preventing the electrode plate from breaking during the winding process and improving the safety performance; on the other hand, appropriate gap is left between the separator and the electrode plate to facilitate flow and infiltration of the electrolyte, thereby improving the kinetic performance of the cell. Further, the first agglomerate is present on surface of the bulges. Therefore, the bulges can provide appropriate adhesion between the separator and the electrode plates, thereby improving the kinetic performance of the battery.

Figure 1:
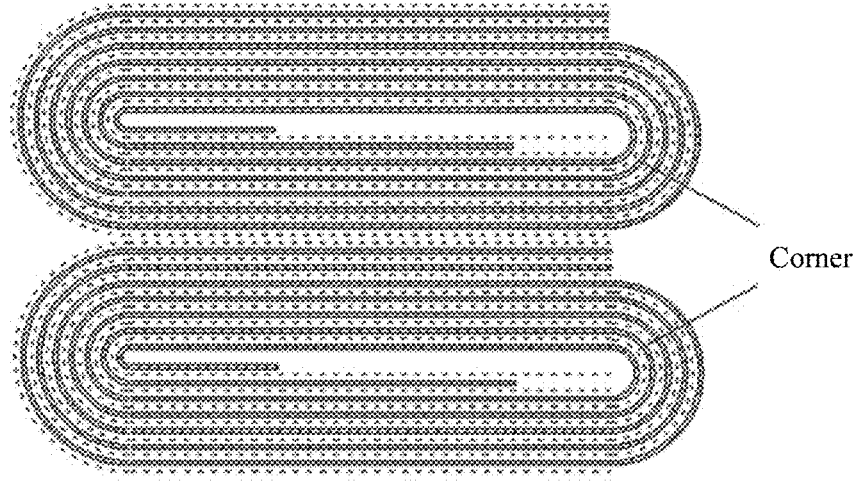
FIG. 1 is a schematic diagram of cell winding with a separator, a positive electrode plate, and a negative electrode plate stacked, according to an embodiment of this application.

Specifically, pressure-sensitive coatings are formed on two opposite surfaces of the substrate, and the sum of the heights of the bulges on the pressure-sensitive coatings of the two sides is the two-side height of the bulges, and the testing method for the two-side height of the bulges includes: referring to FIG. 1, first stacking the negative electrode plate, the separator, and the positive electrode plate in sequence to form a cell and then winding the cell into a roll (the outermost layer of the cell ends with a convex surface of the positive electrode plate), and using a CT device (ZEISS-1500) to scan a position 15±1 mm below an edge of the negative electrode plate at a corner of the wound cell; taking samples along the horizontal and oblique angle (30-45°) from the obtained CT image, and drawing a line along a direction with the largest gap; for the innermost 5 layers, sampling from a convex surface of the innermost positive electrode plate to a convex surface of the 5th layer positive electrode plate, and taking an average value of 4 layers; and for layers 6 and afterwards, sampling from the convex surface of the innermost positive electrode plate to a convex surface of the outermost positive electrode plate, and taking a value for every 5 layers.

Gap average of the innermost 5 layers =

$$\left[ \begin{array}{l} CT \text{ measured distance} - \\ 4*\text{thickness of the negative electrode plate after cold pressing}* \\ \quad (1 + \text{rebound rate of the negative electrode plate}) - \\ 4*\text{thickness of the positive electrode plate after cold pressing} \\ \quad (1 + \text{rebound rate of the positive electrode plate}) - \\ \qquad\qquad\qquad\qquad 8*\text{thickness of the separator} \end{array} \right] \Big/ 8;$$

gap average of layers 6-10 and afterwards =

$$\left[ \begin{array}{l} CT \text{ measured distance} - \\ 5*\text{thickness of the negative electrode plate after cold pressing}* \\ \quad (1 + \text{rebound rate of the negative electrode plate}) - \\ 5*\text{thickness of the positive electrode plate after cold pressing} \\ \quad (1 + \text{rebound rate of the positive electrode plate}) - \\ \qquad\qquad\qquad\qquad 10*\text{thickness of the separator} \end{array} \right] \Big/ 10;$$

rebound rate of the negative electrode plate =

$$\left( \begin{array}{l} \text{thickness of the negative electrode plate} \\ \quad \text{before being put into the housing} - \\ \text{thickness of the negative electrode plate after cold pressing} \end{array} \right) \Big/$$

thickness of the negative electrode plate after cold pressing;

rebound rate of the positive electrode plate =

$$\left( \begin{array}{l} \text{thickness of the positive electrode plate} \\ \quad \text{before being put into the housing} - \\ \text{thickness of the positive electrode plate after cold pressing} \end{array} \right) \Big/$$

thickness of the positive electrode plate after cold pressing; and two-side height of the bulges of the separator =

$$\left( \begin{array}{l} \text{gap average of the innermost 5 layers} + \\ \text{gap average of layers 6-10 and afterwards} \end{array} \right) \Big/ 2.$$

In some embodiments, the pressure-sensitive coating further includes 4-20 parts by weight, for example, 5-18 parts by weight, 7-16 parts by weight, 9-15 parts by weight, or 11-15 parts by weight, of pressure-sensitive adhesive polymer, and the pressure-sensitive adhesive polymer includes an adhesive polymer and a second plasticizer. The combined effect of the adhesive polymer and the second plasticizer can make the pressure-sensitive adhesive polymer have good pressure sensitivity, further making the separator have good pressure sensitivity. This in turn allows the adhesive force under ≤1 MPa to be below 0.1 N/m, which can avoid the adhesion between layers of the separator during roll winding and storage, and makes the separator significantly adhere to the polar plate under ≥2 MPa pressure and thus the electrode plates and the separator can be tightly bonded under room temperature and appropriate pressure when this separator is used to prepare a cell. On the one hand, it can avoid the misalignment between the electrode plates and the separator, which can cause the cell to be scrapped, affect the performance of the cell, and create safety risks. On the other hand, it can eliminate the traditional tunnel furnace and the second composite process in the cell production process, which can save production space and time, reduce energy consumption, significantly improve cell production capacity, and improve the shaping, safety, and kinetic performance of the cell, thus enhancing the safety and kinetic performance of secondary batteries containing such cells and electric apparatuses containing such secondary batteries.

In some embodiments, mass ratio of the adhesive polymer to the second plasticizer in the pressure-sensitive adhesive polymer may be (4-19):1, for example, (4-18):1, (4-15):1, (4-12):1, (4-11):1, (4-10):1, (4-8):1, or (4-6):1. With the relative ratio of the adhesive polymer to the second plasticizer within the above range, it can be ensured that the electrode plates and the separator obtain a large adhesive force under certain pressure, without increasing the resistance of the separator or decreasing the cycling performance of the battery.

The amount of the second plasticizer can be determined using the STA449F3 thermogravimetric analyzer from Shimadzu Corporation, Japan. As a specific example, the test method is as follows: take about 10 mg of the pressure-sensitive adhesive polymer solid, the original mass is recorded as M0, heat to 200° C., and the mass is recorded as M1. The amount of the plasticizer is M0–M1, and the amount of the adhesive polymer is M0–(M0–M1). The test conditions are set as follows: temperature range −100-400° C., nitrogen atmosphere, and 10° C./min.

In some embodiments of this application, the pressure-sensitive adhesive polymer is a core-shell structure, and both core and shell of the core-shell structure include an adhesive polymer and a second plasticizer, where in the core structure, mass ratio of the adhesive polymer to the second plasticizer is (2-5):1, optionally (3-4):1; and in the shell structure, mass ratio of the adhesive polymer to the second plasticizer is (6-10):1, for example, (7-9):1 or (7-8):1. Both the core and shell of the core-shell structure include the adhesive polymer and the second plasticizer, thereby further improving the pressure sensitivity of the pressure-sensitive adhesive polymer and further enhancing the kinetic performance of the separator. On the other hand, the pressure-sensitive adhesive polymer contains the second plasticizer, which can quickly migrate to the main materials of the adhesive polymer and the separator under certain pressure (such as 1 MPa-2 MPa) to plasticize the adhesive polymer, allowing its molecular chain to extend and enhance the riveting effect between the two interfaces by interacting with a thickener such as SBR binder and CMC thickener in the negative electrode plate and the binder such as PVDF in the positive electrode plate through intermolecular hydrogen bonding. At ≥2 MPa, the nuclear structure is crushed, and the second plasticizer in the nucleus is released, which can further enhance the above effect.

In some embodiments, a portion of the second plasticizer is grafted onto the adhesive polymer. For example, based on the weight of the plasticizer, at least 5 wt % of the second plasticizer is grafted onto the adhesive polymer. When a portion of the second plasticizer is grafted onto the adhesive polymer, it can prevent a large amount of the second plasticizer from migrating to the electrolyte during cycling, consuming various functional additives of the electrolyte, increasing the resistance of the separator, and affecting the kinetic performance of the cell. When at least 5 wt % of the second plasticizer is grafted onto the main chain of the adhesive polymer, the separator and the electrode plate can form a "one body and two wings" effect, which can further improve the durability of room temperature bonding, reduce rebound, and ensure that too much of the second plasticizer does not migrate to the electrolyte during the cycle, affecting the performance of the cell. The grafting rate can be detected by infrared testing method, specifically: obtaining the Fourier infrared spectra of the adhesive polymer, the second plasticizer, and the pressure-sensitive adhesive polymer, and a peak at 1500 $cm^{-1}$-1700 $cm^{-1}$ appears in the pressure-sensitive adhesive polymer, which is different from the peaks of the adhesive polymer and the second plasticizer alone. This peak represents the grafted second plasticizer, and the area under the peak represents the amount of the grafted second plasticizer, from which the grafting rate of the second plasticizer can be calculated.

In some embodiments of this application, average particle size of the adhesive polymer is 0.5 μm-3.0 μm, for example, 0.8 μm-2.8 μm, 1 μm-2.5 μm, 1.2 μm-2.3 μm, 1.5 μm-2 μm, or 1.8 μm-2 μm. An adhesive polymer with an average particle size that meets the requirements of this application can help the pressure-sensitive adhesive polymer to be evenly distributed on the composite particles and facilitate its internal and external bonding with the electrode plates under certain pressure. In some embodiments of this application, average particle size of the pressure-sensitive adhesive polymer is 0.5 μm-3.0 μm, optionally 0.8 μm-2 μm.

The average particle size of the pressure-sensitive adhesive polymer may be determined using a laser particle size analyzer (for example, Malvern Master Size 3000) according to the GB/T19077.1-2016 standard.

In some embodiments of this application, DSC melting point of the pressure-sensitive adhesive polymer is −50° C.-100° C., for example, −45° C.-95° C., −40° C.-90° C., −35° C.-85° C., −30° C.-80° C., −25° C.-75° C., −20° C.-70° C., −15° C.-65° C., −10° C.-60° C., −5° C.-55° C., 0° C.-50° C., 5° C.-45° C., 10° C.-40° C., 15° C.-35° C., 20° C.-30° C., or 25° C.-30° C. With the DSC melting point of the pressure-sensitive adhesive polymer within the above range, the adhesive strength at room temperature can be ensured, avoiding excessive adhesive force causing bonding of the separator during roll winding under 1 MPa, and avoiding small adhesive force causing weak bonding between the separator and the electrode plates at room temperature under 2 MPa, which is not conducive to the shaping of the cell.

According to some examples, the DSC melting point has a meaning known in the art and can be determined by instruments and methods known in the art. For example, it can be determined using a DSC melting point tester of instrument model DSC 200F3 from the German company NETZSC. As a specific example, the test method is as follows: Take about 10 mg of the sample for testing. The test conditions are set as follows: temperature range: −100-200° C., nitrogen atmosphere, and 10° C./min. The temperature corresponding to the absorption peak during the first heating is the corresponding DSC melting point.

In some embodiments of this application, the adhesive polymer includes a copolymer formed by at least one of the following first monomers, at least one of the following second monomers, at least one of the following third monomers, and reactive monomers of at least one of the following reactive dispersants:

first monomers, having a melting point typically higher than 80° C., including acrylic acid, methacrylic acid, methyl methacrylate, tert-butyl methacrylate, isobornyl methacrylate, methylol acrylamide, acrylamide, styrene, and acrylonitrile;

second monomers, having a melting point typically lower than 80° C., including $C_4$-$C_{22}$ alkyl acrylate, isobutyl acrylate, isooctyl acrylate, tert-butyl acrylate, 2-ethylhexyl acrylate (isooctyl), cyclohexyl acrylate, ethyl methacrylate, methyl Isobutyl acrylate, 2-ethylhexyl methacrylate, n-hexyl methacrylate, cyclohexyl methacrylate, benzyl methacrylate, 2-hydroxyethyl acrylate, 2-hydroxypropyl acrylate, ethylene urea ethyl methacrylate, dicyclopentene ethoxy methacrylate, dimethylaminoethyl methacrylate, diethyl methacrylate amino ethyl ester, ethylene urea ethyl methacrylate, propylene methacrylate, dicyclopentene ethoxy methacrylate, tetrahydrofuryl methacrylate, and trifluoroethyl methacrylate;

third monomers, including 2-hydroxyethyl methacrylate, 2-hydroxypropyl methacrylate, methacrylate-2-hydroxyethyl ester, 2-hydroxypropyl methacrylate, glycidyl acrylate, glycidyl methacrylate, dimethylaminoethyl methacrylate, diethylaminoethyl methacrylate, vinyltrimethoxysilane, vinyltriethoxysilane, vinyl triisopropoxysilane, methacryloxypropyltrimethoxysilane, N-methylolacrylamide, N-butoxymethyl(meth)acrylamide, diacetoneacrylamide, ethyl methacrylate acetoacetate, divinylbenzene, epoxy resin with an epoxy value of 0.35-0.50, and divinylbenzene; and reactive dispersants, including polyvinyl alcohol, polypropylene alcohol, polypropylene glycol, polyethylene glycol, and polyvinyl acid alcohol. Optionally, these reactive dispersants have a degree of alcoholysis of ≥85% and an average degree of polymerization of 400-2000, preferably a degree of alcoholysis of ≥88% and an average degree of polymerization of 500-1600.

Thus, the adhesive polymer formed has suitable swelling, pressure sensitivity, and adhesion, as well as a suitable elastic modulus, ensuring that the cell has excellent shaping effect, kinetic performance, and safety performance.

It should be noted that, in this application, the term "degree of alcoholysis" refers to the percentage of hydroxyl groups in the original groups in the product obtained through alcoholysis, for which the unit is mole fraction %. For example, there are originally 100 groups (ester groups) and 60 hydroxyl groups after alcoholysis; in this case, the degree of alcoholysis is 60%.

It should be noted that, in this application, the term "average degree of polymerization" refers to a statistical average of degrees of polymerization for a polymer that includes molecules of the same series of polymers with difference degrees of polymerization. There are two commonly used methods to express the average degree of polymerization: the degree of polymerization obtained by averaging the number of molecules, which is referred to as a number-average degree of polymerization; and the degree of polymerization obtained by averaging the weight, called a weight-average degree of polymerization. The "average degree of polymerization" described in this application is a number-average degree of polymerization.

In some embodiments, the second plasticizer includes at least one of glycerol $C_4$-$C_{10}$ alkyl diether, glycerol $C_4$-$C_{10}$ alkyl ether, glycerol $C_4$-$C_{10}$ carboxylic acid monoester, glycerol $C_4$-$C_{10}$ carboxylic acid diester, propylene glycol $C_4$-$C_{10}$ alkyl ether, and glycerol.

In some embodiments, the pressure-sensitive adhesive polymer can be synthesized by the following synthesis method, including the following steps:

Step 1. In a solvent (such as deionized water), sequentially add 0.1 wt %-1 wt % emulsifier (such as allyl sulfonate) (relative to the total weight of the reactive monomer mixture (including the first monomer, second monomer, third monomer, and reactive dispersant), auxiliary agents (including the emulsifier, stabilizer, and aqueous initiator), and the second plasticizer, added when synthesizing the pressure-sensitive adhesive polymer, the same below), 2 wt %-3 wt % low polymer (such as octadecyl methacrylate) with a number-average molecular weight of ≤1000 and a melting point of 0° C.-30° C., and homogenize the mixture at a controlled speed of 8000 r/min-12000 r/min, such as 10000 r/min, for dispersion. The dispersion time can be 20 min-60 min, such as 50 min. The dispersion reaction temperature is 20° C.-40° C., such as 25° C. Thus, a first mixed solution is obtained.

Step 2. Add 1 wt %-4 wt % stabilizer to the first mixed solution, such as containing at least one of polyethylene oxide, allyl polyether sulfate, methylene succinic acid (itaconic acid), styrene sulfonic acid, sodium vinyl sulfonate, and sodium nanocellulose. The homogenization speed is controlled at 6000 r/min-8000 r/min, such as 6500 r/min, and the mixing time is 20 min-60 min, such as 30 min. The mixing reaction temperature is 20° C.-60° C., such as 45° C. Thus, a second mixed solution is obtained.

Step 3. Add 0.05 wt %-0.5 wt % aqueous initiator to the second mixed solution, such as containing at least one of sodium bicarbonate, benzoyl peroxide, lauroyl peroxide, cumene hydroperoxide, tert-butyl hydroperoxide, di-tert-butyl peroxide, diisopropylbenzene peroxide, tert-butyl peroxybenzoate, tert-butyl peroxyisopropylcarbonate, methyl ethyl ketone peroxide, cyclohexanone peroxide, diisopropyl peroxydicarbonate, dicyclohexyl peroxydicarbonate, potassium persulfate, sodium persulfate, ammonium persulfate, azobisisobutyronitrile, and azobisdimethylheptane. The homogenization speed is controlled at 8000 r/min-12000 r/min, such as 8000 r/min, and the mixing time is 20 min-60 min, such as 30 min. The reaction temperature is 60° C.-80° C., such as 72° C. Thus, a third mixed solution is obtained.

Step 4. Under the condition that the homogenization speed is 100 r/min-1000 r/min, such as 400 r/min, gradually and uniformly add 35 wt %-45 wt % monomer mixture (controlled to be completely added in 60 min) to the third mixed solution, where the reaction time is 80 min-100 min, such as 80 min, to obtain a fourth mixed solution.

Step 5. The fourth mixed solution is further reacted under the conditions of a reaction temperature of 80° C.-90° C., such as 84° C., and a homogenization speed of 12000 r/min-18000 r/min, such as 15000 r/min, for a time of 120 min-240 min, such as 180 min, to obtain a fifth mixed solution.

Step 6. Add 10 wt %-20 wt % second plasticizer, such as glycerol, to the fifth mixed solution, and control the reaction temperature to be 80° C.-90° C., such as 84° C. The homogenization speed is controlled at 12000 r/min-18000 r/min, such as 15000 r/min, and the reaction time is 120 min-240 min, such as 180 min. Thus, a sixth mixed solution is obtained.

Step 7. Add 0.05 wt %-0.5 wt % aqueous initiator, such as ammonium persulfate-sodium bicarbonate, to the sixth mixed solution. The homogenization speed is controlled at 8000 r/min-12000 r/min, such as 8000 r/min, and the time is 20-60 min, such as 30 min. The reaction temperature is 60° C.-80° C., such as 72° C. Thus, a seventh mixed solution is obtained.

Step 8. Under the condition that the homogenization speed is 100 r/min-1000 r/min, such as 400 r/min, gradually and uniformly add 30 wt %-40 wt % reactive monomer mixture (controlled to be completely added in 60 min) to the seventh mixed solution, where the reaction time is 100 min-160 min, such as 120 min, to obtain an eighth mixed solution.

Step 9. Add 5 wt %-20 wt % of the second plasticizer, such as glycerol, to the eighth mixed solution, and control the reaction temperature to be 80° C.-90° C., such as 84° C. The homogenization speed is 12000 r/min-18000 r/min, such as 15000 r/min, and the reaction time is 120 min-240 min, such as 180 min. Thus, a ninth mixed solution is obtained.

Step 10. Lower the temperature of the ninth mixed solution to below 50° C., filtering the material, and obtaining a core-shell structure pressure-sensitive adhesive polymer. Those skilled in the art can also synthesize a non-core-shell structure pressure-sensitive adhesive polymer by consulting the above method (omitting the steps 7 to 9 and correspondingly changing the mass fractions of the added second plasticizer and monomer mixture).

In some embodiments, average thickness of the pressure-sensitive coating is 2 μm-20 μm, for example, 4 μm-18 μm, 5 μm-15 μm, 7 μm-12 μm, or 10 μm-12 μm. In this way, the electrode plates and the separator can be tightly bonded under appropriate pressure, improving the kinetic performance of the cell. In some embodiments, the average thickness of the press-sensitive coating is 2 μm-15 μm.

In some embodiments, in the separator of this application, the pressure-sensitive coating may further include organic particles. The organic particles include at least one of polytetrafluoroethylene particles, polychlorotrifluoroethylene particles, polyvinyl fluoride particles, polyvinylidene fluoride particles, polyethylene particles, polypropylene particles, polyacrylonitrile particles, polyethylene oxide particles, copolymer particles of fluorine-containing alkenyl monomer units and vinyl monomer units, copolymer particles of fluorine-containing alkenyl monomer units and acrylate monomer units, copolymer particles of fluorine-containing alkenyl monomer units and acrylic monomer units, and modified compound particles of the homopolymers or copolymers. The composite particles and the organic particles form bulges on the surface of the pressure-sensitive coating. In this way, the cycling performance and safety performance of the battery can be improved.

In some embodiments of this application, the organic particles in the separator of this application form a third agglomerate. $D_v50$ of the third agglomerate is 5 μm-30 μm, for example, 5 μm-28 μm, 5 μm-25 μm, 5 μm-22 μm, 5 μm-20 μm, 5 μm-20 μm, 5 μm-18 μm, 5 μm-15 μm, 5 μm-12 μm, 5 μm-10 μm, 5 μm-8 μm, or 5 μm-6 μm.

In some embodiments, the third agglomerate includes organic particles of primary particle morphology, and a gap is present between adjacent two of the organic particles. The gap may serve as an ion transport channel, thereby improving the ionic conductivity of the separator. In some embodiments, $D_v50$ of the organic particles of primary particle morphology is 50 nm-400 nm, for example, 50 nm-375 nm, 75 nm-375 nm, 100 nm-350 nm, 125 nm-325 nm, 150 nm-300 nm, 175 nm-275 nm, 200 nm-250 nm, or 200 nm-225 nm; in some other embodiment, $D_v50$ of the organic particles of primary particle morphology is 100 nm-200 nm.

In this application, $D_v50$ is a corresponding particle size when a cumulative volume distribution percentage reaches 50%, and $D_v10$ is a corresponding particle size when a cumulative volume distribution percentage reaches 10%. In this application, both $D_v10$ and $D_v50$ of the composite particles may be measured by using a particle size distribution laser diffraction method. For example, they are determined using a laser particle size analyzer (for example, Malvern Master Size 3000) according to the standard GB/T 19077-2016. $D_v50$ of the inorganic particles of primary particle morphology, $D_v50$ of the polyacrylate particles of primary particle morphology, and $D_v50$ of the polyacrylate particles of secondary particle morphology can be obtained through statistics based on a SEM image of the separator. For example, an SEM image of the separator at a magnification of 10 Kx is obtained, 5 parallel samples for each sample, 10 positions for each parallel sample, and 20 points for statistics at each position, and finally an average value is obtained and used as a corresponding particle size. $D_v50$ of the first agglomerate, $D_v50$ of the second agglomerate, and $D_v50$ of the third agglomerate can be obtained through statistics based on a CP diagram of the separator, for example, a CP diagram of the separator at a magnification of 5 Kx is obtained, 5 parallel samples for each sample, 10 positions for each parallel sample, and 20 points for statistics at each position, and finally an average value is obtained and used as a corresponding particle size.

In some embodiments, mass ratio of the composite particles to the organic particles is (20-90):(0-70). For example, the mass ratio of the composite particles to the polyvinylidene fluoride particles is (20-90):(5-65), (20-90):(10-60), (20-90):(20-50), (20-90):(30-40), (30-80):(0-70), (40-70):(0-70), (50-60):(0-70), (30-80):(5-65), (40-65):(10-55), (45-60):(20-45), or (55-60):(30-45). Thus, wettability and distribution uniformity of the electrolyte can be improved, the high-temperature storage performance of the battery can be improved, and the safety performance and cycling performance of the battery can be improved. In some other embodiments, the mass ratio of the composite particles to the organic particles is (45-90):(0-45). Thus, the safety performance and cycling performance of the battery can be improved.

Figure 2:
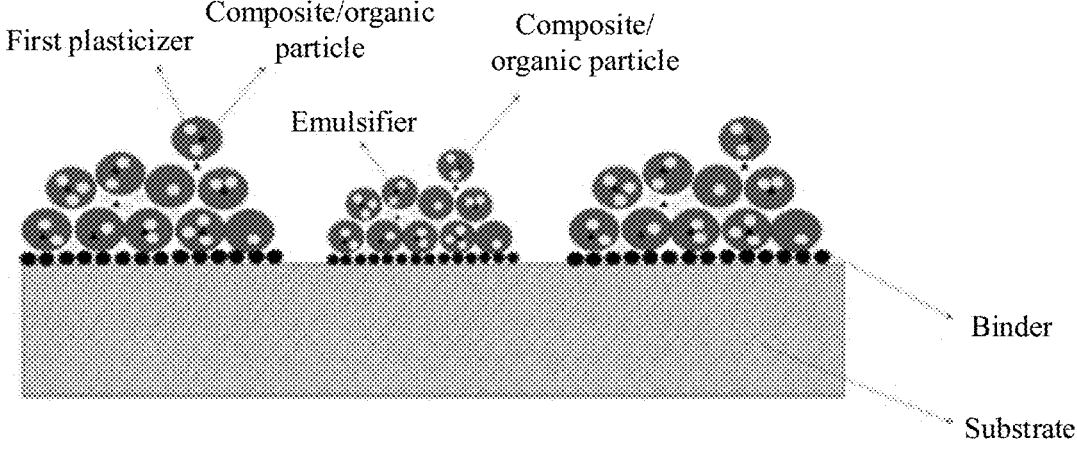
FIG. 2 is a schematic diagram of a structural model of a separator according to an embodiment of this application.

As shown in FIG. 2, the separator includes a substrate and a pressure-sensitive coating (not shown). The pressure-sensitive coating includes composite particles, organic particles, a first plasticizer, an emulsifier, and a binder. The first plasticizer and the emulsifier are evenly distributed inside and between the composite particles, and the composite particles and organic particles are connected to the substrate through the binder. The composite particles and the organic particles form bulges on the surface of the pressure-sensitive coating.

In some embodiments, the pressure-sensitive coating may further include other organic compounds, for example, a polymer for improving heat resistance, a dispersant, a wetting agent, a binder of another type, and the like. The foregoing other organic compounds are all non-granular substances in the pressure-sensitive coating. This application imposes no particular limitation on types of the foregoing other organic compounds, which may be any well-known materials with good improvement performance.

In this application, the substrate is a membrane material with a porous structure having good chemical stability and mechanical stability. In some embodiments, the substrate may be a single-layer membrane material, or a multi-layer composite membrane material. When the substrate is a multi-layer composite membrane material, each layer may be made of the same or different materials.

In some embodiments, in the separator of this application, the substrate may be a porous film or a porous nonwoven net including one or more of the following: polyethylene, polypropylene, polyethylene terephthalate ester, polybutylene terephthalate, polyesters, polyacetals, polyamide, polycarbonate, polyimide, polyetheretherketone, polyaryletherketone, polyetherimide, polyamideimide, polybenzimidazole, polyethersulfone, polyphenylene oxide, cycloolefin copolymer, polyphenylene sulfide, and polyethylene naphthalene. In other embodiments, the substrate is a porous film or a porous nonwoven net including polyethylene and/or polypropylene. Selecting the above substrate for preparation of the separator is conducive to combination of the substrate and the coating through the binder, forming a moderately dense, porous, and lithium ion-conductive separator.

In some other embodiments, in the separator of this application, the substrate has a porosity of 10%-95%, optionally, 35%-45%. In this way, the ionic conductivity of the separator can be improved and the probability of contact between the positive electrode plate and the negative electrode plate can be reduced. In some other embodiments, in the separator of this application, the substrate has a pore diameter of 0.1 μm-50 μm, optionally 0.1 μm-5 μm. Selecting a substrate with the above pore structure makes the separator have good ionic conductivity, reduces the probability of direct contact between the positive electrode plate and the negative electrode plate, and improves the kinetic and safety performance of the cell.

In some embodiments, thickness of the substrate is ≤10 μm; for example, the thickness of the substrate may be 5 μm-10 μm, 5 μm-9 μm, or 7 μm-10 μm. When the thickness of the substrate is controlled within the given range, the energy density of the battery can be further improved with the cycling performance and safety performance of the battery ensured.

In some embodiments, a peeling force of the pressure-sensitive coating is more than 40 N/m; after the separator is placed in an environment at 150° C. for 1 hour without clamping, its thermal shrinkage rate in the longitudinal (MD) or transverse (TD) direction is below 5%, and a damage size under the heat gun at 200° C. is 0; the adhesion force between the separator and the electrode plate is above 1.0 N/m, and resistance of the separator at 25° C. is below 2 ohm.

According to some embodiments, the air permeability, transverse tensile strength (MD), longitudinal tensile strength (TD), transverse elongation at break, and longitudinal elongation at break of the separator have the meanings known in the art, and can be measured using known methods in the art. For example, they can all be tested in accordance with the standard GB/T36363-2018.

According to some embodiments, the material types of polyacrylate particles, ester compound, emulsifier, pressure-sensitive adhesive polymer, and organic particles can be tested using devices and methods known in the art. For example, infrared spectrum of a material can be tested to determine characteristic peaks that the material contains, so as to determine a material category. In particular, infrared spectroscopy can be performed on the organic particles by using instruments and methods known in the art, for example, an infrared spectrometer. For example, the test is performed by using an IS10 Fourier transform infrared spectrometer from Nicolet (Nicolet) of the USA, according to general rules of GB/T6040-2002 infrared spectroscopy method.

A second aspect of this application further provides a method for preparing separator, including the following steps:

(1) providing a substrate; and (2) forming a pressure-sensitive coating on at least a portion of surface of the substrate, where the pressure-sensitive coating includes composite particles and a first plasticizer, the composite particles form bulges on surface of the pressure-sensitive coating, and the composite particles include polyacrylate particles and inorganic particles, where the inorganic particle is present between at least two of the polyacrylate particles, and solubility parameter of the first plasticizer and solubility parameter of the composite particles have a difference with an absolute value of 0.3 $MPa^{1/2}$-4 $MPa^{1/2}$.

Specifically, the substrate, first plasticizer and composite particles are the same as those described above, and details are not repeated herein.

In some embodiments, the separator includes a substrate and a pressure-sensitive coating, the pressure-sensitive coating being disposed on only one surface of the substrate.

In some embodiments, the separator includes a substrate and a pressure-sensitive coating, the pressure-sensitive coating being disposed on two surfaces of the substrate.

In some embodiments, step (2) can be performed by the following steps: (2-1) providing a pressure-sensitive coating slurry, where the pressure-sensitive coating slurry includes composite particles and a first plasticizer; and (2-2) applying the pressure-sensitive coating slurry on at least one side of the substrate, followed by drying to obtain the separator.

In some embodiments, in step (2-1), a solvent in the pressure-sensitive coating slurry may be water, such as deionized water.

In some embodiments, in step (2-1), the pressure-sensitive coating slurry may further include other organic compounds, for example, may further include a polymer for improving heat resistance, a dispersant, a wetting agent, and an emulsion-like binder. The other organic compounds are all non-granular in the dried coating.

In some embodiments, in step (2-1), a solid content of the pressure-sensitive coating slurry may be controlled to be within 10%-20% by weight, for example, 12%-15%. The solid content of the pressure-sensitive coating slurry being within the above range can improve the yield rate of coating production and enhance the adhesion performance of the coating.

In some embodiments, in step (2-1), the first plasticizer includes an ester compound, and solubility parameter of the ester compound is 12 $MPa^{1/2}$-30 $MPa^{1/2}$.

In some embodiment, in step (2-1), the pressure-sensitive coating slurry further includes an emulsifier, the emulsifier including at least one of an anionic emulsifier and a nonionic emulsifier. The addition of the emulsifier allows the ester compound to be distributed uniformly in the composite particles, further enhancing the pressure-sensitivity and yield rate of the separator. As an example, anionic emulsifiers include alkylbenzene sulfonates; nonionic emulsifiers include fatty alcohol polyoxyethylene ether, alkylphenol polyoxyethylene ether, fatty acid polyoxyethylene ether, glycerol esters, and one or more polyglycerol stearate.

In some embodiments, in step (2-1), the pressure-sensitive coating slurry further includes a pressure-sensitive adhesive polymer, the pressure-sensitive adhesive polymer including an adhesive polymer and a second plasticizer. The combined effect of the adhesive polymer and the second plasticizer can make the pressure-sensitive adhesive polymer have good pressure sensitivity, further making the separator have good pressure sensitivity. This in turn allows the adhesive force under ≤1 MPa to be below 0.1 N/m, which can avoid the adhesion between layers of the separator during roll winding and storage, and makes the separator significantly adhere to the polar plate under ≥2 MPa pressure and thus the electrode plates and the separator can be tightly bonded under room temperature and appropriate pressure when this separator is used to prepare a cell On the one hand, it can avoid the misalignment between the electrode plates and the separator, which can cause the cell to be scrapped, affect the performance of the cell, and create safety risks. On the other hand, it can eliminate the traditional tunnel furnace and the second composite process in the cell production process, which can save production space and time, reduce energy consumption, significantly improve cell production capacity, and improve the shaping, safety, and kinetic performance of the cell, thus enhancing the safety and kinetic performance of secondary batteries containing such cells and electric apparatuses containing such secondary batteries.

In some embodiments, the pressure-sensitive coating slurry further includes organic particles, and the organic particles include at least one of polytetrafluoroethylene particles, polychlorotrifluoroethylene particles, polyvinyl fluoride particles, polyvinylidene fluoride particles, polyethylene particles, polypropylene particles, polyacrylonitrile particles, polyethylene oxide particles, copolymer particles of fluorine-containing alkenyl monomer units and vinyl monomer units, copolymer particles of fluorine-containing alkenyl monomer units and acrylate monomer units, copolymer particles of fluorine-containing alkenyl monomer units and acrylic monomer units, and modified compound particles of the homopolymers or copolymers.

In some embodiments, in step (2-2), the coating application is done by a coater.

In embodiments of this application, a model of the coater is not specially limited, and a coater purchased from the market may be used.

In some embodiments, in step (2-2), the coating application may use a process such as transfer coating, rotary spraying, and dip coating. For example, the coating application uses transfer coating.

In some embodiments, the coater includes a gravure roller, and the gravure roller is used for transferring the coating slurry to the substrate.

Controlling the foregoing process parameters within the given ranges can further improve use performance of the separator in this application. Those skilled in the art can selectively adjust one or more of the foregoing process parameters according to actual production.

The foregoing substrate, composite particles, ester compound, emulsifier, organic particles, pressure-sensitive adhesive polymer, and organic particles may be purchased from the market.

A third aspect of this application provides a battery, including the above separator according to the first aspect or the separator prepared according to the second aspect.

The battery is a battery that can be charged after being discharged, to activate active material for continuous use.

Generally, the battery includes a positive electrode plate, a negative electrode plate, a separator, and an electrolyte. In a charge and discharge process of the battery, active ions are intercalated and deintercalated between the positive electrode plate and the negative electrode plate. The separator is disposed between the positive electrode plate and the negative electrode plate to provide separation. The electrolyte conducts ions between the positive electrode plate and the negative electrode plate.

Positive Electrode Plate

In the battery, the positive electrode plate usually includes a positive electrode current collector and a positive electrode film layer provided on the positive electrode current collector, where the positive electrode film layer includes a positive electrode active material.

The positive electrode current collector may use a common metal foil sheet or a composite current collector (the composite current collector can be made by providing a metal material on a polymer matrix). As an example, the positive electrode current collector may use an aluminum foil.

A specific type of the positive electrode active material is not limited. An active material known in the art that can be used as the positive electrode of the battery, and those skilled in the art may select an active material based on actual needs.

As an example, the positive electrode active material may include, but is not limited to, one or more of lithium transition metal oxide, olivine-structured lithium-containing phosphate, and modified compounds thereof. Examples of the lithium transition metal oxide may include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. Examples of the olivine-structured lithium-containing phosphate may include, but are not limited to, one or more of lithium iron phosphate, composite materials of lithium iron phosphate and carbon, lithium manganese phosphate, composite materials of lithium manganese phosphate and carbon, lithium manganese iron phosphate, composite materials of lithium manganese iron phosphate and carbon, and modified compounds thereof. These materials are all commercially available.

The modified compounds of the foregoing materials may be obtained through doping modification and/or surface coating modification to the materials.

The positive electrode film layer generally may optionally include a binder, a conductive agent, or other optional additives.

In an example, the conductive agent may be one or more of superconducting carbon, acetylene black, carbon black, Ketjen black, carbon dot, carbon nanotube, Super P (SP), graphene, and carbon nanofiber.

In an example, the binder may be one or more of styrene-butadiene rubber (SBR), water-based acrylic resin (water-based acrylic resin), polyvinylidene fluoride (PVDF), polytetrafluoroethylene (PTFE), ethylene-vinyl acetate copolymer (EVA), polyacrylic acid (PAA), carboxymethyl cellulose (CMC), polyvinyl alcohol (PVA), and polyvinyl butyral (PVB).

Negative Electrode Plate

In the battery, the negative electrode plate usually includes a negative electrode current collector and a negative electrode film layer provided on the negative electrode current collector, where the negative electrode film layer includes a negative electrode active material.

The negative electrode current collector may use a common metal foil sheet or a composite current collector (for example, the composite current collector may be formed by providing a metal material on a polymer matrix). As an example, the negative electrode current collector may use a copper foil.

A specific type of the negative electrode active material is not limited. An active material known in the art that can be used as the negative electrode of the battery, and those skilled in the art may select an active material based on actual needs. As an example, the negative electrode active material may include, but is not limited to, one or more of artificial graphite, natural graphite, hard carbon, soft carbon, silicon-based material, and tin-based material. The silicon-based material may include one or more of elemental silicon, silicon-oxygen compounds (such as silicon monoxide), silicon-carbon compounds, silicon-nitrogen compounds, and silicon alloys. The tin-based material may include one or more of elemental tin, tin-oxygen compounds, and tin alloys. These materials are all commercially available.

In some embodiments, the negative electrode active material may include a silicon-based material to further improve energy density of the battery.

The negative electrode film layer generally may optionally include a binder, a conductive agent, or other optional additives.

In an example, the conductive agent may include one or more of superconducting carbon, acetylene black, carbon black, Ketjen black, carbon dots, carbon nanotubes, graphene, and carbon nanofibers.

In an example, the binder may include one or more of styrene-butadiene rubber (SBR), water-borne acrylic resin (water-based acrylic resin), polyvinylidene fluoride (PVDF), polytetrafluoroethylene (PTFE), ethylene vinyl acetate (EVA), polyvinyl alcohol (PVA), and polyvinyl butyral (PVB).

As an example, other optional additives may be a thickening and dispersing agent (for example, sodium carboxymethyl cellulose CMC-Na) or a PTC thermistor material.

Electrolyte

The battery may include an electrolyte, and the electrolyte conducts ions between the positive electrode and the negative electrode. The electrolyte may include an electrolytic salt and a solvent.

As an example, the electrolytic salt may be one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(fluorosulfonyl)imide (LiFSI), lithium bistrifluoromethanesulfonimide (LiTFSI), lithium trifluoromethanesulfonate (LiTFS), lithium difluoro(oxalato)borate (LiDFOB), lithium dioxalate borate (LiBOB), lithium difluorophosphate ($LiPO_2F_2$), lithium difluoro(dioxalato)phosphate (LiDFOP), and lithium tetrafluoro oxalato phosphate (LiTFOP).

As an example, the solvent may include one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoro ethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), methyl ethyl sulfone (EMS), and diethyl sulfone (ESE).

In some embodiments, the electrolyte further includes an additive. For example, the additive may include a negative electrode film-forming additive, or may include a positive electrode film-forming additive, or may include an additive capable of improving some performance of the battery, for example, an additive for improving overcharge performance of the battery, an additive for improving high-temperature performance of the battery, or an additive for improving low-temperature performance of the battery.

In some embodiments, the battery can be a lithium ion secondary battery.

Figure 3:
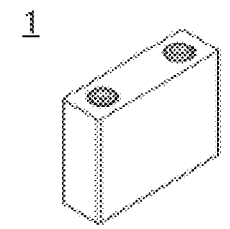
FIG. 3 is a schematic structural diagram of a battery according to an embodiment of this application.

Embodiments of this application do not impose any special limitations on the shape of the battery, and the battery may be of a cylindrical shape, a rectangular shape, or any other shapes. FIG. 3 shows a battery 1 with a rectangular structure in an example.

In some embodiments, the battery may include an outer package. The outer package is used for packaging the positive electrode plate, negative electrode plate, and electrolyte.

In some embodiments, the outer package may include a housing and a cover plate. The housing may include a base plate and a side plate connected onto the base plate, and the base plate and the side plate enclose an accommodating cavity. The housing has an opening communicating with the accommodating cavity, and the cover plate can cover the opening to close the accommodating cavity.

The positive electrode plate, the negative electrode plate, and the separator may be made into an electrode assembly through winding or lamination. The electrode assembly is enclosed in the accommodating cavity. The electrolyte may be a liquid electrolyte, and the liquid electrode infiltrates into the electrode assembly. There may be one or more electrode assemblies in the battery, and the quantity may be adjusted as required.

In some embodiments, the outer package of the battery may be a hard shell, for example, a hard plastic shell, an aluminum shell, or a steel shell.

The outer package of the battery may alternatively be a soft pack, for example, a soft pouch. A material of the soft pack may be plastic, for example, may include one or more of polypropylene (PP), polybutylene terephthalate (PBT), polybutylene succinate (PBS), and the like.

In some embodiments, batteries may be assembled into a battery module, and the battery module may include a plurality of batteries. The specific quantity may be adjusted based on the use application and capacity of the battery module.

FIG. 4 shows a battery module 2 as an example. Referring to FIG. 4, in the battery module 2, a plurality of secondary batteries 1 may be sequentially arranged along a length direction of the battery module 2. Certainly, the batteries may alternatively be arranged in any other manners. Further, the plurality of batteries 1 may be fastened through fasteners.

The battery module 2 may alternatively include a shell with an accommodating space, and the plurality of secondary batteries 1 are accommodated in the accommodating space. In some embodiments, the battery module may be further assembled into a battery pack, and a quantity of battery modules included in the battery pack may be adjusted based on application and capacity of the battery pack.

FIG. 5 and FIG. 6 show a battery pack 3 in an example. Referring to FIG. 5 and FIG. 6, the battery pack 3 may include a battery box and a plurality of battery modules 2 disposed in the battery box. The battery box includes an upper box body 4 and a lower box body 5. The upper box body 4 can cover the lower box body 5 and form an enclosed space for accommodating the battery modules 2. The plurality of battery modules 2 may be arranged in the battery box in any manner.

Electric Apparatus

This application further provides an electric apparatus. The electric apparatus includes the battery, and the battery is used to supply electric energy. Specifically, the battery may be used as a power source for the electric apparatus, and may also be used as an energy storage unit for the electric apparatus. The electric apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, ship, a satellite, an energy storage system, and the like.

FIG. 7 shows an electric apparatus as an example. This electric apparatus is a battery electric vehicle, a hybrid electric vehicle, a plug-in hybrid electric vehicle, or the like.

In another example, the electric apparatus may be a mobile phone, a tablet computer, a notebook computer, or the like. Such electric apparatus is usually required to be light and thin, and may use a battery as a power source.

To describe the technical problems solved by embodiments of this application, technical solutions, and beneficial effects of this application more clearly, the following further provides descriptions in detail with reference to the embodiments and accompanying drawings. Apparently, the described embodiments are merely some but not all of the embodiments of this application. The following description of at least one exemplary embodiment is merely illustrative and definitely is not construed as any limitation on this application or on use of this application. All other embodiments obtained by persons of ordinary skill in the art based on the embodiments of this application without creative efforts shall fall within the protection scope of this application.

I. Preparation of Separator (1) A PE substrate with a thickness of 9 μm, a pore size of 50 nm, and a porosity of 38% was provided.

(2) A coating slurry was prepared: Composite particles, first plasticizer, emulsifier, pressure-sensitive adhesive polymer (with a glass transition temperature of about 10° C., an average particle size of 1.1 μm, including an adhesive polymer and a second plasticizer in a mass ratio of 5:1, (with 8 wt % of the second plasticizer relative to the weight of the second plasticizer grafted onto the adhesive polymer), and some deionized water, where the adhesive polymer was 30 wt % isobutyl acrylate+25 wt % isooctyl acrylate+5 wt % 2-hydroxypropyl methacrylate+15 wt % styrene+22 wt % acrylamide+3% polyethylene glycol copolymer, and the second plasticizer was glycerol), organic particles, and dispersant (BYK-22136) were mixed in an appropriate amount of solvent deionized water to obtain a pressure-sensitive coating slurry with a solid content of 12% (by weight).

(3) The pressure-sensitive coating slurry prepared in step (2) was applied on both surfaces of the PE substrate with a coating machine and dried to obtain the separator 1, where the thickness of the pressure-sensitive coating on one side of the separator was 3 μm.

The above composite particles were prepared by performing the following steps:

a. required monomers of 10 wt % 2-hydroxyethyl acrylate, 66 wt % n-butyl acrylate, 8 wt % methyl methacrylate, 1 wt % trimethylolpropane triacrylate, 10 wt % acrylonitrile, and 5 wt % acrylamide were stirred and mixed to uniformity at room temperature to obtain mixed monomers;

b. 2 kg of mixed monomers, 60 g of sodium lauryl sulfate emulsifier, 20 g of ammonium persulfate initiator, and 2.40 kg of deionized water were added into a 10 L four-necked flask equipped with a mechanical stirring means, a thermometer and a condenser tube, and were stirred and emulsified at a rotation speed of 1600 rpm for 30 minutes; the temperature was raised to 75° C. under the protection of nitrogen, and after 4 hours of reaction, a NaOH aqueous solution with a concentration of 1 wt % was used to adjust the pH to 6.5 and was then immediately cooled down to below 40° C. to obtain the material, that is, to obtain the organic polymer in the emulsion state, with a solid content of about 45 wt %; and c. the above organic polymer of dry weight and silicon oxide were added into an appropriate amount of deionized water at the mass ratio of 9:1 and stirred for 1 hour to be fully mixed, and then the solvent was removed through spray drying to obtain powder, followed by grinding and pulverization, to obtain composite particles with $D_b50$ of 5 μm.

All materials used in the examples can be obtained commercially. For example:

The inorganic particles may be purchased from Anhui Estone Materials Technology Co., Ltd.

The organic particles may be purchased from Ruyuan East Sunshine Fluororesin Co., Ltd.

The substrate may be purchased from Shanghai Energy New Materials Technology Co., Ltd.

The dispersant may be purchased from Changshu Wealthy Science and Technology Co., Ltd.

The wetting agent may be purchased from Dow Chemical Company.

The first plasticizer may be purchased from Huntsman Corporation.

The emulsifier may be purchased from BASF SE.

The pressure-sensitive adhesive polymer may be purchased from Avery Dennison Corporation.

Corresponding parameters for preparation process of separators 1-63 are shown in Tables 1 to 7.

TABLE 1

| | | Separator 1 | Separator 2 | Separator 3 | Separator 4 | Separator 5 | Separator 6 | Separator 7 | Separator 8 | Separator 9 |
|---|---|---|---|---|---|---|---|---|---|---|
| Composite particles | Polyacrylate particles | Composition | 10 wt % 2-hydroxyethyl acrylate + 66 wt % n-butyl acrylate + 8 wt % methyl methacrylate + 1 wt % trimethylol pro-pane triacrylate + 10 wt % acrylonitrile + 5 wt % acrylamide | 10 wt % 2-hydroxyethyl acrylate + 66 wt % n-butyl acrylate + 8 wt % methyl methacrylate + 1 wt % trimethylol pro-pane triacrylate + 10 wt % acrylonitrile + 5 wt % acrylamide | 10 wt % 2-hydroxyethyl acrylate + 66 wt % n-butyl acrylate + 8 wt % methyl methacrylate + 1 wt % trimethylol pro-pane triacrylate + 10 wt % acrylonitrile + 5 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 22 wt % 2-hydroxyethyl acrylate + 8 wt % n-butyl acrylate + 4 wt % methyl methacrylate + 1 wt % trimethylol pro-pane triacrylate + 30 wt % acrylonitrile + 35 wt % acrylamide | 22 wt % 2-hydroxyethyl acrylate + 8 wt % n-butyl acrylate + 4 wt % methyl methacrylate + 1 wt % trimethylol pro-pane triacrylate + 30 wt % acrylonitrile + 35 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide |
| | | Proportion of component in composite particles (wt %) | 90 | 90 | 90 | 90 | 90 | 90 | 90 | 90 | 90 |
| | | D,50 of composite particles (μm) | 5 | 5 | 5 | 5 | 5 | 5 | 5 | 5 | 5 |
| | Inorganic particles | Composition | Silicon oxide | Silicon oxide | Silicon oxide | Silicon oxide | Silicon oxide | Silicon oxide | Silicon oxide | Silicon oxide | Silicon oxide |
| | | Proportion of component in composite particles (wt %) | 10 | 10 | 10 | 10 | 10 | 10 | 10 | 10 | 10 |
| Solubility parameter a (MPa$^{1/2}$) | | | 20.5 | 20.5 | 20.5 | 23.5 | 23.5 | 25.1 | 25.1 | 23.5 | 23.5 |
| Amount of composite particles added (parts by weight) | | | 90 | 90 | 90 | 90 | 90 | 90 | 90 | 80 | 85 |

TABLE 1-continued

| | | Separator 1 | Separator 2 | Separator 3 | Separator 4 | Separator 5 | Separator 6 | Separator 7 | Separator 8 | Separator 9 |
|---|---|---|---|---|---|---|---|---|---|---|
| First plasticizer | Composition | Isobutyl acetate | Ethyl acetate | Dimethyl carbonate | Diethylene glycol butyl ether acetate | 1,2-butenyl carbonate | Propylene carbonate | 80 wt % ethylene carbonate + 20 wt % propylene carbonate | Diethylene glycol butyl ether acetate | Diethylene glycol butyl ether acetate |
| | Solubility parameter b ($MPa^{1/2}$) | 16.8 | 18.2 | 19.4 | 22.9 | 24.8 | 27.2 | 28.9 | 22.9 | 22.9 |
| | Amount added (parts by weight) | 15 | 15 | 15 | 15 | 15 | 15 | 15 | 15 | 15 |
| | Difference between solubility parameter of composite particles and solubility parameter of first plasticizer, $|a - b|$ ($MPa^{1/2}$) | 3.7 | 2.3 | 1.1 | 0.6 | 1.3 | 2.1 | 3.7 | 0.6 | 0.6 |
| Emulsifier | Composition | — | — | — | — | — | — | — | — | — |
| | Amount added (parts by weight) | — | — | — | — | — | — | — | — | — |
| Pressure-sensitive adhesive polymer | Adhesive polymer Composition | 30 wt % isobutyl acrylate + 25 wt % isooctyl acrylate + 5 wt % 2-hydroxypropyl acrylate + 15 wt % styrene + 22 wt % acrylamide + 3 wt % polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3 wt % polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3 wt % polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3 wt % polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3 wt % polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3 wt % polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3 wt % polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3 wt % polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3 wt % polyethylene glycol copolymer |
| Second plasticizer | Composition | Glycerol | Glycerol | Glycerol | Glycerol | Glycerol | Glycerol | Glycerol | Glycerol | Glycerol |
| | Amount added (parts by weight) | 10 | 10 | 10 | 10 | 10 | 10 | 10 | 10 | 10 |
| Bulges | Two-side height of bulges (μm) | 20 | 20 | 20 | 20 | 20 | 20 | 20 | 20 | 20 |
| | Composition of organic particles | — | — | — | — | — | — | — | — | — |
| | Mass ratio of composite particles to organic particles | — | — | — | — | — | — | — | — | — |

TABLE 2

| | | Separator 10 | Separator 11 | Separator 12 | Separator 13 | Separator 14 | Separator 15 | Separator 16 | Separator 17 | Separator 18 |
|---|---|---|---|---|---|---|---|---|---|---|
| Composite particles | Polyacrylate particles | Composition | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide |
| | | Proportion of component in composite particles (wt %) | 90 | 90 | 90 | 90 | 90 | 90 | 90 | 90 | 90 |
| | | D,50 of composite particles (μm) | 5 | 5 | 5 | 5 | 5 | 5 | 5 | 5 | 5 |
| | Inorganic particles | Type | Silicon oxide | Silicon oxide | Silicon oxide | Silicon oxide | Silicon oxide | Silicon oxide | Silicon oxide | Silicon oxide | Silicon oxide |
| | | Proportion of component in composite particles (wt %) | 10 | 10 | 10 | 10 | 10 | 10 | 10 | 10 | 10 |
| | | Solubility parameter a (MPa$^{1/2}$) | 23.5 | 23.5 | 23.5 | 23.5 | 23.5 | 23.5 | 23.5 | 23.5 | 23.5 |
| | Amount of composite particles added (parts by weight) | | 88 | 92 | 96 | 90 | 90 | 90 | 90 | 90 | 90 |
| First plasticizer | Composition | | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate |
| | Solubility parameter b (MPa$^{1/2}$) | | 22.9 | 22.9 | 22.9 | 22.9 | 22.9 | 22.9 | 22.9 | 22.9 | 22.9 |

TABLE 2-continued

| | | Separator 10 | Separator 11 | Separator 12 | Separator 13 | Separator 14 | Separator 15 | Separator 16 | Separator 17 | Separator 18 |
|---|---|---|---|---|---|---|---|---|---|---|
| | Amount added (parts by weight) | 15 | 15 | 15 | 5 | 10 | 20 | 25 | 30 | 0.1 |
| | Difference between solubility parameter of composite particles and solubility parameter of first plasticizer, $|a - b|$ (MPa$^{1/2}$) | 0.6 | 0.6 | 0.6 | 0.6 | 0.6 | 0.6 | 0.6 | 0.6 | 0.6 |
| Emulsifier | Composition | — | — | — | — | — | — | — | — | — |
| | Amount added (parts by weight) | — | — | — | — | — | — | — | — | — |
| Pressure-sensitive adhesive polymer | Adhesive polymer Composition | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer |
| Second plasticizer | Composition | Glycerol | Glycerol | Glycerol | Glycerol | Glycerol | Glycerol | Glycerol | Glycerol | Glycerol |
| | Amount added (parts by weight) | 10 | 10 | 10 | 10 | 10 | 10 | 10 | 10 | 10 |
| Bulges | Two-side height of bulges (μm) | 20 | 20 | 20 | 20 | 20 | 20 | 20 | 20 | 20 |
| | Composition of organic particles | — | — | — | — | — | — | — | — | — |
| | Mass ratio of composite particles to organic particles | — | — | — | — | — | — | — | — | — |

TABLE 3

| | | | Separator 19 | Separator 20 | Separator 21 | Separator 22 | Separator 23 | Separator 24 | Separator 25 | Separator 26 | Separator 27 |
|---|---|---|---|---|---|---|---|---|---|---|---|
| Composite particles | Polyacrylate particles | Composition | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide |
| | | Proportion of component in composite particles (wt %) | 90 | 90 | 90 | 90 | 90 | 99.9 | 99 | 98 | 93 |
| | | D,50 of composite particles (μm) | 5 | 5 | 5 | 5 | 5 | 5 | 5 | 5 | 5 |
| | Inorganic particles | Type | Silicon oxide | Silicon oxide | Silicon oxide | Silicon oxide | Silicon oxide | Silicon oxide | Silicon oxide | Silicon oxide | Silicon oxide |
| | | Proportion of component in composite particles (wt %) | 10 | 10 | 10 | 10 | 10 | 0.1 | 1 | 2 | 7 |
| | | Solubility parameter a (MPa$^{1/2}$) | 23.5 | 23.5 | 23.5 | 23.5 | 23.5 | 23.5 | 23.5 | 23.5 | 23.5 |
| | | Amount of composite particles added (parts by weight) | 90 | 90 | 90 | 90 | 90 | 90 | 90 | 90 | 90 |

TABLE 3-continued

| | | Separator 19 | Separator 20 | Separator 21 | Separator 22 | Separator 23 | Separator 24 | Separator 25 | Separator 26 | Separator 27 |
|---|---|---|---|---|---|---|---|---|---|---|
| First plasticizer | Composition | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate |
| | Solubility parameter b $(\text{MPa}^{1/2})$ | 22.9 | 22.9 | 22.9 | 22.9 | 22.9 | 22.9 | 22.9 | 22.9 | 22.9 |
| | Amount added (parts by weight) | 100 | 15 | 15 | 15 | 15 | 15 | 15 | 15 | 15 |
| | Difference between solubility parameter of composite particles and solubility parameter of first plasticizer, $|a - b|$ $(\text{MPa}^{1/2})$ | 0.6 | 0.6 | 0.6 | 0.6 | 0.6 | 0.6 | 0.6 | 0.6 | 0.6 |
| Emulsifier | Composition | / | Alkylphenol polyoxyethylene ether | Alkylphenol polyoxyethylene ether | Alkylphenol polyoxyethylene ether | Alkylphenol polyoxyethylene ether | Alkylphenol polyoxyethylene ether | Alkylphenol polyoxyethylene ether | Alkylphenol polyoxyethylene ether | Alkylphenol polyoxyethylene ether |
| | Amount added (parts by weight) | / | 0.1 | 0.3 | 0.5 | 1 | 0.3 | 0.3 | 0.3 | 0.3 |
| Pressure-sensitive adhesive polymer | Adhesive polymer Composition | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer |
| Second plasticizer | Composition | Glycerol | Glycerol | Glycerol | Glycerol | Glycerol | Glycerol | Glycerol | Glycerol | Glycerol |
| | Amount added (parts by weight) | 10 | 10 | 10 | 10 | 10 | 10 | 10 | 10 | 10 |
| Bulges | Two-side height of bulges (μm) | 20 | 20 | 20 | 20 | 20 | 20 | 20 | 20 | 20 |
| | Composition of organic particles | / | / | / | / | / | / | / | / | / |
| | Mass ratio of composite particles to organic particles | / | / | / | / | / | / | / | / | / |

TABLE 4

| | | | Separator 28 | Separator 29 | Separator 30 | Separator 31 | Separator 32 | Separator 33 | Separator 34 | Separator 35 | Separator 36 |
|---|---|---|---|---|---|---|---|---|---|---|---|
| Composite particles | Polyacrylate particles | Composition | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide |
| | | Proportion of component in composite particles (wt %) | 88 | 85 | 75 | 60 | 50 | 40 | 90 | 90 | 90 |
| | | D,50 of composite particles (μm) | 5 | 5 | 5 | 5 | 5 | 5 | 2.5 | 3 | 4 |
| | Inorganic particles | Type | Silicon oxide | Silicon oxide | Silicon oxide | Silicon oxide | Silicon oxide | Silicon oxide | Silicon oxide | Silicon oxide | Silicon oxide |
| | | Proportion of component in composite particles (wt %) | 12 | 15 | 25 | 40 | 50 | 60 | 10 | 10 | 10 |
| | Solubility parameter a (MPa$^{1/2}$) | | 23.5 | 23.5 | 23.5 | 23.5 | 23.5 | 23.5 | 23.5 | 23.5 | 23.5 |
| | Amount of composite particles added (parts by weight) | | 90 | 90 | 90 | 90 | 90 | 90 | 90 | 90 | 90 |

43 44

TABLE 4-continued

|  |  | Separator 28 | Separator 29 | Separator 30 | Separator 31 | Separator 32 | Separator 33 | Separator 34 | Separator 35 | Separator 36 |
|---|---|---|---|---|---|---|---|---|---|---|
| First plasticizer | Composition | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate |
|  | Solubility parameter b ($MPa^{1/2}$) |  |  |  |  |  |  | 22.9 | 22.9 | 22.9 |
|  | Amount added (parts by weight) |  |  |  |  |  |  | 15 | 15 | 15 |
|  | Difference between solubility parameter of composite particles and solubility parameter of first plasticizer, $|a - b|$ ($MPa^{1/2}$) | 0.6 | 0.6 | 0.6 | 0.6 | 0.6 | 0.6 | 0.6 | 0.6 | 0.6 |
| Emulsifier | Composition | Alkylphenol polyoxy-ethylene ether | Alkylphenol polyoxy-ethylene ether | Alkylphenol polyoxy-ethylene ether | Alkylphenol polyoxy-ethylene ether | Alkylphenol polyoxy-ethylene ether | Alkylphenol polyoxy-ethylene ether | Alkylphenol polyoxy-ethylene ether | Alkylphenol polyoxy-ethylene ether | Alkylphenol polyoxy-ethylene ether |
|  | Amount added (parts by weight) | 0.3 | 0.3 | 0.3 | 0.3 | 0.3 | 0.3 | 0.3 | 0.3 | 0.3 |
| Pressure-sensitive adhesive polymer | Adhesive polymer Composition | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer |
| Second plasticizer | Composition | Glycerol | Glycerol | Glycerol | Glycerol | Glycerol | Glycerol | Glycerol | Glycerol | Glycerol |
|  | Amount added (parts by weight) | 10 | 10 | 10 | 10 | 10 | 10 | 10 | 10 | 10 |
| Bulges | Two-side height of bulges (μm) | 20 | 20 | 20 | 20 | 20 | 20 | 20 | 20 | 20 |
|  | Composition of organic particles | — | — | — | — | — | — | — | — | — |
|  | Mass ratio of composite particles to organic particles | — | — | — | — | — | — | — | — | — |

TABLE 5

| | | Separator 37 | Separator 38 | Separator 39 | Separator 40 | Separator 41 | Separator 42 | Separator 43 | Separator 44 | Separator 45 |
|---|---|---|---|---|---|---|---|---|---|---|
| Composite particles | Polyacrylate particles | Composition | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide |
| | | Proportion of component in composite particles (wt %) | 90 | 90 | 90 | 90 | 90 | 90 | 90 | 90 | 90 |
| | | $D,50$ of composite particles (μm) | 6 | 8 | 10 | 1 | 15 | 5 | 5 | 5 | 5 |
| | Inorganic particles | Type | Silicon oxide | Silicon oxide | Silicon oxide | Silicon oxide | Silicon oxide | Silicon oxide | Silicon oxide | Silicon oxide | Silicon oxide |
| | | Proportion of component in composite particles (wt %) | 10 | 10 | 10 | 10 | 10 | 10 | 10 | 10 | 10 |
| | | Solubility parameter a ($MPa^{1/2}$) | 23.5 | 23.5 | 23.5 | 23.5 | 23.5 | 23.5 | 23.5 | 23.5 | 23.5 |
| Amount of composite particles added (parts by weight) | | | 90 | 90 | 90 | 90 | 90 | 90 | 90 | 90 | 90 |

TABLE 5-continued

| | | Separator 37 | Separator 38 | Separator 39 | Separator 40 | Separator 41 | Separator 42 | Separator 43 | Separator 44 | Separator 45 |
|---|---|---|---|---|---|---|---|---|---|---|
| First plasticizer | Composition | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate |
| | Solubility parameter b ($MPa^{1/2}$) | 22.9 | 22.9 | 22.9 | 22.9 | 22.9 | 22.9 | 22.9 | 22.9 | 22.9 |
| | Amount added (parts by weight) | 15 | 15 | 15 | 15 | 15 | 15 | 15 | 15 | 15 |
| | Difference between solubility parameter of composite particles and solubility parameter of first plasticizer, $|a - b|$ ($MPa^{1/2}$) | 0.6 | 0.6 | 0.6 | 0.6 | 0.6 | 0.6 | 0.6 | 0.6 | 0.6 |
| Emulsifier | Composition | Alkylphenol polyoxy-ethylene ether | Alkylphenol polyoxy-ethylene ether | Alkylphenol polyoxy-ethylene ether | Alkylphenol polyoxy-ethylene ether | Alkylphenol polyoxy-ethylene ether | / | / | / | / |
| | Amount added (parts by weight) | 0.3 | 0.3 | 0.3 | 0.3 | 0.3 | / | / | / | / |
| Pressure-sensitive adhesive polymer | Composition | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer |
| Second plasticizer | Composition | Glycerol | Glycerol | Glycerol | Glycerol | Glycerol | Glycerol | Glycerol | Glycerol | Glycerol |
| | Amount added (parts by weight) | 10 | 10 | 10 | 10 | 10 | 4 | 8 | 15 | 20 |
| Bulges | Two-side height of bulges (μm) | 20 | 20 | 20 | 20 | 20 | 20 | 20 | 20 | 20 |
| | Composition of organic particles | / | / | / | / | / | / | / | / | / |
| | Mass ratio of composite particles to organic particles | / | / | / | / | / | / | / | / | / |

TABLE 6

| | | | Separator 46 | Separator 47 | Separator 48 | Separator 49 | Separator 50 | Separator 51 | Separator 52 | Separator 53 | Separator 54 |
|---|---|---|---|---|---|---|---|---|---|---|---|
| Composite particles | Polyacrylate particles | Composition | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide |
| | | Proportion of component in composite particles (wt %) | 90 | 90 | 90 | 90 | 90 | 90 | 90 | 90 | 90 |
| | | D,50 of composite particles (μm) | 5 | 5 | 5 | 5 | 4 | 6 | 8 | 3 | 8 |
| | Inorganic particles | Type | Silicon oxide | Silicon oxide | Silicon oxide | Silicon oxide | Silicon oxide | Silicon oxide | Silicon oxide | Silicon oxide | Silicon oxide |
| | | Proportion of component in composite particles (wt %) | 10 | 10 | 10 | 10 | 10 | 10 | 10 | 10 | 10 |
| | | Solubility parameter a ($MPa^{1/2}$) | 23.5 | 23.5 | 23.5 | 23.5 | 23.5 | 23.5 | 23.5 | 23.5 | 23.5 |
| | | Amount of composite particles added (parts by weight) | 90 | 90 | 90 | 90 | 90 | 90 | 90 | 90 | 90 |

TABLE 6-continued

| | | Separator 46 | Separator 47 | Separator 48 | Separator 49 | Separator 50 | Separator 51 | Separator 52 | Separator 53 | Separator 54 |
|---|---|---|---|---|---|---|---|---|---|---|
| First plasticizer | Composition | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate |
| | Solubility parameter b ($MPa^{1/2}$) | 22.9 | 22.9 | 22.9 | 22.9 | 22.9 | 22.9 | 22.9 | 22.9 | 22.9 |
| | Amount added (parts by weight) | 15 | 15 | 15 | 15 | 15 | 15 | 15 | 15 | 15 |
| | Difference between solubility parameter of composite particles and solubility parameter of first plasticizer, $|a - b|$ ($MPa^{1/2}$) | 0.6 | 0.6 | 0.6 | 0.6 | 0.6 | 0.6 | 0.6 | 0.6 | 0.6 |
| Emulsifier | Composition | / | / | Alkylphenol polyoxyethylene ether | Alkylphenol polyoxyethylene ether | Alkylphenol polyoxyethylene ether | Alkylphenol polyoxyethylene ether | Alkylphenol polyoxyethylene ether | Alkylphenol polyoxyethylene ether | Alkylphenol polyoxyethylene ether |
| | Amount added (parts by weight) | / | / | 0.3 | 0.3 | 0.3 | 0.3 | 0.3 | 0.3 | 0.3 |
| Pressure-sensitive adhesive polymer | Adhesive polymer Composition | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer |
| Second plasticizer | Composition | Glycerol | Glycerol | Glycerol | Glycerol | Glycerol | Glycerol | Glycerol | Glycerol | Glycerol |
| | Amount added (parts by weight) | 1 | 30 | 10 | 10 | 10 | 10 | 10 | 10 | 10 |
| Bulges | Two-side height of bulges (μm) | 20 | 20 | 15 | 25 | 30 | 45 | 60 | 10 | 70 |
| | Composition of organic particles | / | / | / | / | / | / | / | / | / |
| | Mass ratio of composite particles to organic particles | / | / | / | / | / | / | / | / | / |

TABLE 7

| | | | Separator 55 | Separator 56 | Separator 57 | Separator 58 | Separator 59 | Separator 60 | Separator 61 | Separator 62 | Separator 63 |
|---|---|---|---|---|---|---|---|---|---|---|---|
| Composite particles | Polyacrylate particles | Composition | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide | 10 wt % 2-hydroxyethyl acrylate + 66 wt % n-butyl acrylate + 8 wt % methyl methacrylate + 1 wt % trimethylol pro-pane triacrylate + 10 wt % acrylonitrile + 5 wt % acrylamide | 22 wt % 2-hydroxyethyl acrylate + 27 wt % n-butyl acrylate + 8 wt % methyl methacrylate + 1 wt % trimethylol pro-pane triacrylate + 30 wt % acrylonitrile + 35 wt % acrylamide | 19 wt % 2-hydroxyethyl acrylate + 27 wt % n-butyl acrylate + 8 wt % methyl methacrylate + 1 wt % trimethylol pro-pane triacrylate + 20 wt % acrylonitrile + 25 wt % acrylamide |
| | | Proportion of component in composite particles (wt %) | 90 | 90 | 90 | 90 | 90 | 90 | 90 | 90 | 100 |
| | | D,50 of composite particles (μm) | 5 | 5 | 5 | 5 | 5 | 5 | 5 | 5 | 5 |
| | Inorganic particles | Type | Silicon oxide | Silicon oxide | Silicon oxide | Silicon oxide | Silicon oxide | Silicon oxide | Silicon oxide | Silicon oxide | Silicon oxide |
| | | Proportion of component in composite particles (wt %) | 10 | 10 | 10 | 10 | 10 | 10 | 10 | 10 | 0 |
| Solubility parameter a (MPa$^{1/2}$) | | | 23.5 | 23.5 | 23.5 | 23.5 | 23.5 | 23.5 | 20.5 | 25.1 | 23.5 |
| Amount of composite particles added (parts by weight) | | | 90 | 90 | 90 | 90 | 90 | 90 | 90 | 90 | 90 |

55 56

TABLE 7-continued

| | | Separator 55 | Separator 56 | Separator 57 | Separator 58 | Separator 59 | Separator 60 | Separator 61 | Separator 62 | Separator 63 |
|---|---|---|---|---|---|---|---|---|---|---|
| First plasticizer | Composition | Diethylene glycol butyl ether acetate | Diethylene glycol butyl ether acetate | Diethylene glycol butyl ether acetate | Diethylene glycol butyl ether acetate | Diethylene glycol butyl ether acetate | Diethylene glycol butyl ether acetate | 80 wt % ethylene carbonate + 20 wt % propylene carbonate | Isobutyl acetate | Diethylene glycol butyl ether acetate |
| | Solubility parameter b $(MPa^{1/2})$ | 22.9 | 22.9 | 22.9 | 22.9 | 22.9 | 22.9 | 28.9 | 16.8 | 22.9 |
| | Amount added (parts by weight) | 15 | 15 | 15 | 15 | 15 | 15 | 15 | 15 | 15 |
| Difference between solubility parameter of composite particles and solubility parameter of first plasticizer, $|a - b|$ $(MPa^{1/2})$ | | 0.6 | 0.6 | 0.6 | 0.6 | 0.6 | 0.6 | 8.4 | 8.3 | 0.6 |
| Emulsifier | Composition | Alkylphenol polyoxyethylene ether | Alkylphenol polyoxyethylene ether | Alkylphenol polyoxyethylene ether | Alkylphenol polyoxyethylene ether | Alkylphenol polyoxyethylene ether | Alkylphenol polyoxyethylene ether | / | / | Alkylphenol polyoxyethylene ether |
| | Amount added (parts by weight) | 0.3 | 0.3 | 0.3 | 0.3 | 0.3 | 0.3 | / | / | 0.3 |
| Pressure-sensitive adhesive polymer | Adhesive polymer Composition | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer | 30 wt % isobutyl acrylate + 25 wt % isooctyl acrylate + 5 wt % 2-hydroxypropyl acrylate + 15 wt % styrene + 22 wt % acrylamide + 3% polyethylene glycol copolymer |
| Second plasticizer | Composition | Glycerol | Glycerol | Glycerol | Glycerol | Glycerol | Glycerol | Glycerol | Glycerol | Glycerol |
| | Amount added (parts by weight) | 10 | 10 | 10 | 10 | 10 | 10 | 10 | 10 | 10 |
| Bulges | Two-side height of bulges (μm) | 20 | 20 | 20 | 20 | 20 | 20 | 20 | 20 | 20 |
| | Composition of organic particles | polyvinyl fluoride | polyvinyl fluoride | polyvinyl fluoride | polyvinyl fluoride | polyvinyl fluoride | polyvinyl fluoride | / | / | / |
| | Mass ratio of composite particles to organic particles | 65:25 | 50:40 | 40:50 | 30:60 | 20:70 | 15:75 | / | / | / |

II. Preparation of Battery

Example 1

1. Preparation of Positive Electrode Plate

Positive electrode active material $LiNi_{1/3}Mn_{1/3}Co_{1/3}O_2$, conductive agent acetylene black, and binder polyvinylidene fluoride (PVDF) were dispersed at a mass ratio of 94:3:3 in solvent N-methylpyrrolidone (NMP) and mixed thoroughly to obtain a uniform positive electrode slurry. The positive electrode slurry was evenly applied on a positive electrode current collector aluminum foil, followed by drying, cold pressing, slitting, and cutting to obtain a positive electrode plate. The amount of positive electrode active material loaded on the positive electrode plate was 0.32 g/1540.25 mm², with a density of 3.45 g/cm³.

Preparation of Negative Electrode Plate

Active substance artificial graphite, conductive agent acetylene black, binder styrene-butadiene rubber (SBR), and thickener sodium carboxymethyl cellulose (CMC) were mixed at a mass ratio of 95:2:2:1 in solvent deionized water and stirred thoroughly to obtain a uniform negative electrode slurry. The slurry was applied on a negative electrode current collector Cu foil, followed by drying and cold pressing to obtain a negative electrode plate. The amount of graphite loaded on the negative electrode plate was 0.18 g/1540.25 mm², with a density of 1.65 g/cm³.

3. Separator

The separator 1 prepared above was used as the separator.

Preparation of Electrolyte

Ethylene carbonate (EC), ethyl methyl carbonate (EMC), and diethyl carbonate (DEC) were mixed at a volume ratio of 3:5:2, and then $LiPF_6$ was uniformly dissolved in the solution to obtain an electrolyte. In the electrolyte, $LiPF_6$ had a concentration of 1 mol/L.

5. Preparation of Battery

The positive electrode plate, separator, and negative electrode plate were sequentially stacked so that the separator was located between the positive electrode plate and the negative electrode plate to provide separation. Then, the resulting stack was wound to form an electrode assembly. The electrode assembly was placed in an outer package and the prepared electrolyte was injected into the electrode assembly that was dried, followed by vacuum sealing, standing, formation, and shaping, to obtain a secondary battery.

The preparation methods for secondary batteries in Examples 2-60 and Comparative Examples 1-3 are similar to that of the battery in Example 1, except for different separators used. The secondary batteries in Example 2-60 used separators 2-60, and the secondary battery in Comparative Examples 1-3 used separators 61-63.

III. Evaluation of Adhesion Performance Between Separator and Positive Electrode Plate or Negative Electrode Plate The test procedure is as follows:

1. A separator 300 mm long and 100 mm wide and the positive and negative electrode plates prepared above were selected.

2. The upper and lower sides of the separator were wrapped with paper, and a sample of 54.2 mm×72.5 mm was punched out using a cutting die and a punching machine.

3. The die-cut separator sample and the positive or negative electrode plate were stacked neatly, with the separator facing upward, Teflon of 130 mm×130 mm was placed on the upper and lower sides, and the stacked sample was put in the middle of a cardboard and covered with a 150 mm×160 mm cardboard.

4. The stacked sample was placed into a flat presser with pressure properly set, air pressure was adjusted. Hot pressing was performed with the pressure of the flat presser set to 1150 KG±10 KG (equivalent to about 3 MPa) or 2650 Kg±10 KG (equivalent to about 7 MPa), temperature to 25° C. or 95° C., and time to 10 s.

5. The hot-pressed sample was cut into small strips of 72.5 mm×15 mm using a cutting die and a punching machine.

6. The electrode plate was fastened to a steel plate with a two-side tape on one side and was attached to a separator on the other side, and a 15 mm-wide A4 paper strip was attached to the separator using a two-side tape. Preparation of the test sample was completed. During the test, the steel plate for fastening the electrode plate was fastened, and the A4 paper strip was pulled upward with a tensile machine to separate the separator from the electrode plate.

7. A Gotech tensile machine was powered on and set sequentially to adhesion force test, speed of 50 mm/min, and initial fixture spacing of 40 mm.

8. The test sample was placed between the clamps, with an end of the steel plate fastened to the lower clamp and the A4 paper fastened to the upper clamp, and the upper and lower clamps were tightened with respective fixtures.

9. A stretching operation screen on the computer desktop was clicked, and force, displacement, and the like were set to zero. "Start" was clicked to perform a pre-stretch for about 5 mm; after the pre-stretch, the force, displacement, and the like were reset to zero; then, the test was started. At the end of the test, complete data was exported and stored.

10. At least 5 test samples were measured in each group, and if curve repeatability of the adhesion force test of the 5 test samples was relatively good, the next group was tested; otherwise, these 5 test samples had to be tested further until good repeatability was obtained.

11. At the end of the test, an adhesion strength (N/m)-displacement curve was drawn and the adhesion force was calculated.

IV. Evaluation of Resistance Performance of the Separator

The test procedure is as follows:

(1) Preparation of the separator: Each separator under test was cut into samples of the same size (45.3 mm*33.7 mm), and the samples were baked in an environment of 60° C. for at least 4 hours and then quickly transferred to a 25° C. class 100 clean glove box for later use.

(2) Preparation of the symmetric cell limited area pocket (symmetric cell limited area aluminum-plastic bag (aluminum-plastic bags are commonly used commodities for soft-pack batteries, made of polypropylene and aluminum foil)): A blank symmetric cell assembled with Cu foil to Cu foil (copper foil to copper foil) as the current collector was used. The limited area of the pocket was achieved through a hole punched in a green adhesive. The pocket was baked in an environment of 60° C. for at least 4 hours before use and then quickly transferred to the 25° C. class 100 clean glove box mentioned in (1) above for later use.

(3) Assembly of the symmetric cell: Using the anode plate as the electrode, 5 groups of symmetric cell samples with different numbers of separator layers (1, 2, 3, 4, and 5 layers) were assembled in situ in the glove box mentioned in (1) above, and each group had 5 parallel samples. The pocket was side-sealed with a simple packaging machine, (300 μL) electrolyte was injected with a pipette, and the bottom was sealed.

(4) Clamping the assembled symmetric cell: The assembled symmetric cell was placed in the glove box mentioned in (1) above overnight to allow the electrolyte to fully infiltrate the separator. The next day, a metal clamp was applied, and the pressure of the clamp was controlled at 0.7 MPa.

(5) Measuring the electrochemical impedance spectroscopy (EIS):

Before measuring, the symmetric cells with different numbers of separator layers were placed in a high and low temperature box at 25° C. for half an hour, and EIS was measured at the set temperature (25° C.) (in the case of low temperature (for example, −25° C. to 0° C.), the constant temperature time can be extended accordingly, such as about two hours).

(6) A French Bio-Logic VMP3 electrochemical workstation was used with voltage <5V, current <400 mA, and current accuracy 0.1%*100 μA. During measurement, the EIS measurement conditions were set to a voltage frequency of 1 MHz-1 kHz and a perturbation voltage of 5 MV, and the pressure of the clamp was controlled at 0.7 MPa.

(7) A scatter plot was made of the real part of the EIS data against the negative imaginary part. The data for parallel samples with different and the same numbers of layers were plotted on the same graph to obtain a comparison of the EIS raw data.

(8) The points in the non-first quadrant of the EIS graph obtained in (7) were removed to obtain a new EIS graph. A linear fit was performed on the scatter points in the first quadrant in the new EIS graph to obtain a correlation formula. Let y=0, and the obtained x value is the resistance of the electrolyte in the separator. By extension, the EIS data obtained can be linearly fitted to obtain the resistance values of parallel samples with different numbers of layers.

V. Evaluation of Battery Performance

Cycling performance test:

Five prepared batteries from each group were taken and subjected to repeated charging and discharging through the following steps, and the cycling capacity retention rates of the batteries under the conditions of 25° C. or 45° C. were calculated.

At 25° C., the secondary batteries prepared according to the examples and comparative examples were fixed using three steel fixtures with a unilateral heat insulation pad of 1 mm between the fixtures and the batteries, with a pre-tightening force of 0.1 MPa applied. The first charge and discharge were performed. Constant current and constant voltage charging were carried out at a charging current of 0.7 C (which is the current value that completely discharges the theoretical capacity within 2 hours) until the upper limit voltage was 4.4V, followed by constant current discharge at a discharge current of 0.5 C until the final voltage was 3V. The discharge capacity of the first cycle was recorded. Then, 1000 charge and discharge cycles were performed, and the discharge capacity of the 1000th cycle was recorded. Cycling capacity retention rate =(discharge capacity of the 1000th cycle/discharge capacity of the 1st cycle)×100%.

At 45° C., the secondary batteries prepared according to the examples and comparative examples were fixed using three steel fixtures with a unilateral heat insulation pad of 1 mm between the fixtures and the batteries, with a pre-tightening force of 0.1 MPa applied. The first charge and discharge were performed. Constant current and constant voltage charging were carried out at a charging current of 0.7 C (which is the current value that completely discharges the theoretical capacity within 2 hours) until the upper limit voltage was 4.4V, followed by constant current discharge at a discharge current of 0.5 C until the final voltage was 3V. The discharge capacity of the first cycle was recorded. Then, 1000 charge and discharge cycles were performed, and the discharge capacity of the 1000th cycle was recorded. Cycling capacity retention rate =(discharge capacity of the 1000th cycle/discharge capacity of the 1st cycle)×100%.

Table 8 lists performance data of separators and batteries that is obtained through measurement in Examples 1-60 and Comparative Examples 1-3.

TABLE 8

| | Adhesion force of positive electrode plate (N/m) | | Adhesion force of negative electrode plate (N/m) | | Resistance of separator (Ω) | Capacity retention rate at 25° C. (%) | Capacity retention rate at 45° C. (%) |
|---|---|---|---|---|---|---|---|
| | 25° C.-7 MPa-10 s | 95° C.-3 MPa-10 s | 25° C.-7 MPa-10 s | 95° C.-3 MPa-10 s | | | |
| Example 1 | 1 | 2.5 | 0.4 | 1.0 | 1.24 | 86 | 85 |
| Example 2 | 1.2 | 2.8 | 0.5 | 1.1 | 1.24 | 87 | 85 |
| Example 3 | 1.3 | 3.1 | 0.5 | 1.2 | 1.23 | 88 | 86 |
| Example 4 | 1.4 | 3.2 | 0.6 | 1.3 | 1.23 | 88 | 87 |
| Example 5 | 1.2 | 2.9 | 0.5 | 1.2 | 1.23 | 87 | 86 |
| Example 6 | 1 | 2.6 | 0.4 | 1.0 | 1.21 | 86 | 84 |
| Example 7 | 0.8 | 2.1 | 0.3 | 0.8 | 1.2 | 84 | 82 |
| Example 8 | 1.4 | 2.9 | 0.6 | 1.2 | 1.35 | 85 | 83 |
| Example 9 | 1.3 | 3 | 0.5 | 1.2 | 1.31 | 86 | 85 |
| Example 10 | 1.3 | 3.1 | 0.5 | 1.2 | 1.24 | 87 | 85 |
| Example 11 | 1.3 | 3.2 | 0.5 | 1.3 | 1.22 | 88 | 86 |
| Example 12 | 1.2 | 3 | 0.5 | 1.2 | 1.22 | 87 | 86 |
| Example 13 | 1 | 2.6 | 0.4 | 1.0 | 1.2 | 86 | 84 |
| Example 14 | 1.1 | 2.8 | 0.4 | 1.1 | 1.21 | 86 | 85 |
| Example 15 | 1.6 | 3.1 | 0.6 | 1.2 | 1.29 | 86 | 83 |
| Example 16 | 1.8 | 3.1 | 0.7 | 1.2 | 1.53 | 84 | 82 |
| Example 17 | 2 | 3.2 | 0.8 | 1.3 | 1.75 | 82 | 80 |
| Example 18 | 0.7 | 1.9 | 0.3 | 0.8 | 1.22 | 78 | 76 |
| Example 19 | 2.2 | 3.6 | 0.9 | 1.4 | 2.2 | 75 | 72 |
| Example 20 | 1.5 | 3.3 | 0.6 | 1.3 | 1.23 | 88 | 87 |
| Example 21 | 1.7 | 3.5 | 0.7 | 1.4 | 1.25 | 89 | 87 |
| Example 22 | 2 | 4.5 | 0.8 | 1.8 | 1.6 | 85 | 83 |
| Example 23 | 2.3 | 5 | 0.9 | 2.0 | 2.5 | 78 | 76 |
| Example 24 | 2.1 | 4.8 | 0.8 | 1.9 | 1.76 | 82 | 80 |
| Example 25 | 2 | 4.6 | 0.8 | 1.8 | 1.68 | 83 | 81 |

TABLE 8-continued

| | Adhesion force of positive electrode plate (N/m) | | Adhesion force of negative electrode plate (N/m) | | Resistance of separator (Ω) | Capacity retention rate at 25° C. (%) | Capacity retention rate at 45° C. (%) |
|---|---|---|---|---|---|---|---|
| | 25° C.-7 MPa-10 s | 95° C.-3 MPa-10 s | 25° C.-7 MPa-10 s | 95° C.-3 MPa-10 s | | | |
| Example 26 | 1.9 | 4.2 | 0.8 | 1.7 | 1.53 | 84 | 82 |
| Example 27 | 1.7 | 3.8 | 0.7 | 1.5 | 1.37 | 86 | 84 |
| Example 28 | 1.5 | 3.2 | 0.6 | 1.3 | 1.34 | 86 | 85 |
| Example 29 | 1.4 | 2.7 | 0.6 | 1.1 | 1.41 | 85 | 82 |
| Example 30 | 1 | 2.3 | 0.4 | 0.9 | 1.48 | 84 | 81 |
| Example 31 | 0.8 | 2.2 | 0.3 | 0.9 | 1.54 | 83 | 81 |
| Example 32 | 0.6 | 1.8 | 0.2 | 0.6 | 1.62 | 81 | 80 |
| Example 33 | 0.3 | 1 | 0.1 | 0.4 | 1.9 | 75 | 73 |
| Example 34 | 1.3 | 2.7 | 0.5 | 1.1 | 1.5 | 84 | 82 |
| Example 35 | 1.4 | 3 | 0.6 | 1.2 | 1.37 | 85 | 83 |
| Example 36 | 1.6 | 3.2 | 0.6 | 1.3 | 1.31 | 86 | 84 |
| Example 37 | 1.5 | 3.3 | 0.6 | 1.3 | 1.29 | 87 | 85 |
| Example 38 | 1.4 | 2.9 | 0.6 | 1.2 | 1.38 | 85 | 83 |
| Example 39 | 1.2 | 2.7 | 0.5 | 1.1 | 1.6 | 83 | 81 |
| Example 40 | 1 | 2.8 | 0.4 | 1.1 | 2.3 | 77 | 73 |
| Example 41 | 0.5 | 1.3 | 0.2 | 0.5 | 2.2 | 78 | 71 |
| Example 42 | 1 | 2.2 | 0.4 | 0.9 | 1.22 | 85 | 83 |
| Example 43 | 1.3 | 3 | 0.5 | 1.2 | 1.23 | 87 | 83 |
| Example 44 | 1.7 | 3.8 | 0.7 | 1.5 | 1.5 | 84 | 82 |
| Example 45 | 1.8 | 4 | 0.7 | 1.6 | 1.71 | 82 | 80 |
| Example 46 | 0.6 | 1.3 | 0.2 | 0.5 | 1.22 | 76 | 72 |
| Example 47 | 2 | 4.2 | 0.8 | 1.7 | 2.3 | 75 | 71 |
| Example 48 | 1.2 | 2.7 | 0.5 | 1.1 | 1.42 | 84 | 82 |
| Example 49 | 1.4 | 3 | 0.6 | 1.2 | 1.37 | 87 | 85 |
| Example 50 | 1.1 | 2.6 | 0.4 | 1.0 | 1.43 | 84 | 82 |
| Example 51 | 1 | 2.4 | 0.4 | 1.0 | 1.5 | 83 | 81 |
| Example 52 | 0.8 | 2 | 0.3 | 0.8 | 1.69 | 81 | 80 |
| Example 53 | 0.8 | 1.9 | 0.3 | 0.8 | 1.9 | 76 | 73 |
| Example 54 | 0.7 | 1.9 | 0.2 | 0.7 | 1.8 | 72 | 70 |
| Example 55 | 1.8 | 3.2 | 0.7 | 1.3 | 1.27 | 86 | 84 |
| Example 56 | 1.93 | 2.9 | 0.8 | 1.2 | 1.34 | 85 | 83 |
| Example 57 | 2 | 2.5 | 0.8 | 1.0 | 1.4 | 83 | 81 |
| Example 58 | 2.05 | 2.45 | 0.8 | 1.0 | 1.47 | 82 | 81 |
| Example 59 | 2.1 | 2.4 | 0.8 | 1.0 | 1.52 | 81 | 81 |
| Example 60 | 2.2 | 2.4 | 0.9 | 1.0 | 1.61 | 75 | 73 |
| Comparative example 1 | 0.6 | 1.3 | 0.2 | 0.5 | 1.67 | 64 | 57 |
| Comparative example 2 | 0.5 | 1.3 | 0.2 | 0.5 | 1.52 | 62 | 55 |
| Comparative example 3 | 3 | 5 | 1.2 | 2.0 | 2.4 | 65 | 60 |

According to Table 8, at 25° C. and 7 MPa, the adhesion force of the separator to the positive electrode plate in Examples 1-60 is between 0.3 N/m and 2.3 N/m; at 25° C. and 7 MPa, the adhesion force of the separator to the negative electrode plate in Examples 1-60 is between 0.1 N/m and 0.9 N/m; at 95° C. and 3 MPa, the adhesion force of the separator to the positive electrode plate in Examples 1-60 is between 1 N/m and 4.8 N/m; and at 95° C. and 3 MPa, the adhesion force of the separator to the negative electrode plate in Examples 1-60 is between 0.4 N/m and 2.0 N/m. The separator resistance of Examples 1-60 is not higher than 2.52, and the cycling capacity retention rate of batteries in Examples 1-60 is better than that of batteries in Comparative Examples 1-3. This indicates that the adhesion force between the separator of this application and the electrode plates is appropriate, and the resistance is low, which can improve the kinetic performance and safety performance of the battery.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A separator, comprising:

a substrate; and a pressure-sensitive coating, wherein the pressure-sensitive coating is formed on at least a portion of surface of the substrate, and the pressure-sensitive coating comprises composite particles and a first plasticizer, the composite particles form bulges on surface of the pressure-sensitive coating, and the composite particles comprise polyacrylate particles and inorganic particles, wherein the inorganic particle is present between at least two of the polyacrylate particles, and solubility parameter of the first plasticizer and solubility parameter of the composite particles have a difference with an absolute value of 0.3 $MPa^{1/2}$-4 $MPa^{1/2}$.

2. The separator according to claim 1, wherein the first plasticizer comprises an ester compound, and solubility parameter of the ester compound is 12 $MPa^{1/2}$-30 $MPa^{1/2}$.

3. The separator according to claim 2, wherein the pressure-sensitive coating further comprises an emulsifier, the emulsifier comprising at least one of an anionic emulsifier and a nonionic emulsifier.

4. The separator according to claim 3, wherein the pressure-sensitive coating comprises 80-96 parts by weight of composite particles, 5-30 parts by weight of ester compound, and 0.1-0.5 parts by weight of emulsifier.

5. The separator according to claim 1, wherein $D_v50$ of the composite particles is ≥2.5 μm, preferably 2.5 μm-10 μm, and more preferably 3 μm-8 μm.

6. The separator according to claim 1, wherein the composite particles comprise a first agglomerate, and the first agglomerate comprises at least two of the inorganic particles.

7. The separator according to claim 6, wherein 0.01 μm≤$D_v50$ of the first agglomerate ≤$D_v10$ of the composite particles.

8. The separator according to claim 1, wherein the composite particles comprise inorganic particles of primary particle morphology.

9. The separator according to claim 8, wherein $D_v50$ of the inorganic particles of primary particle morphology is 0.01 μm-1 μm, preferably 0.5 μm-1 μm.

10. The separator according to claim 1, wherein the composite particles comprise a second agglomerate, and the second agglomerate comprises at least two of the polyacrylate particles.

11. The separator according to claim 10, wherein $D_v50$ of the second agglomerate is 0.3 μm-5 μm, preferably 1 μm-2 μm.

12. The separator according to claim 1, wherein the polyacrylate particles comprise polyacrylate particles of primary particle morphology and/or polyacrylate particles of secondary particle morphology.

13. The separator according to claim 12, wherein $D_v50$ of the polyacrylate particles of primary particle morphology is 50 nm-400 nm, preferably 100 nm-200 nm.

14. The separator according to claim 12, wherein $D_v50$ of the polyacrylate particles of secondary particle morphology is 2 μm-15 μm, preferably 5 μm-8 μm.

15. The separator according to claim 1, wherein the polyacrylate particles have a glass transition temperature of 20° C.-80° C., preferably 25° C.-65° C.

16. The separator according to claim 1, wherein percentage of the inorganic particles in the composite particles is 1 wt %-50 wt %, optionally 1 wt %-40 wt %, more optionally 2 wt %-15 wt %, and most preferably 5 wt %-15 wt %.

17. The separator according to claim 1, wherein two-side height of the bulges is 15 μm-60 μm.

18. The separator according to claim 1, wherein the pressure-sensitive coating further comprises 4-20 parts by weight of pressure-sensitive adhesive polymer, the pressure-sensitive adhesive polymer comprising an adhesive polymer and a second plasticizer.

19. The separator according to claim 18, wherein average particle size of the adhesive polymer is 0.5 μm-3.0 μm, optionally 0.8 μm-2.0 μm.

20. The separator according to claim 18, wherein DSC melting point of the pressure-sensitive adhesive polymer is −50° C.-100° C., optionally −45° C.-60° C.

21. The separator according to claim 18, wherein mass ratio of the adhesive polymer to the second plasticizer is (4-19):1, optionally (4-11):1.

22. The separator according to claim 18, wherein the pressure-sensitive adhesive polymer is a core-shell structure, and both core and shell of the core-shell structure comprise an adhesive polymer and a second plasticizer, wherein, in the core structure, mass ratio of the adhesive polymer to the second plasticizer is (2-5):1, optionally (3-4):1; and in the shell structure, mass ratio of the adhesive polymer to the second plasticizer is (6-10):1, optionally (7-9):1.

23. The separator according to claim 18, wherein the adhesive polymer comprises a copolymer formed by at least one of the following first monomers, at least one of the following second monomers, at least one of the following third monomers, and reactive monomers of at least one of the following reactive dispersants:

first monomers, comprising acrylic acid, methacrylic acid, methyl methacrylate, tert-butyl methacrylate, isobornyl methacrylate, methylol acrylamide, acrylamide, styrene, and acrylonitrile;

second monomers, comprising $C_4$-$C_{22}$ alkyl acrylate, isobutyl acrylate, isooctyl acrylate, tert-butyl acrylate, 2-ethylhexyl acrylate (isooctyl), cyclohexyl acrylate, ethyl methacrylate, methyl Isobutyl acrylate, 2-ethylhexyl methacrylate, n-hexyl methacrylate, cyclohexyl methacrylate, benzyl methacrylate, 2-hydroxyethyl acrylate, 2-hydroxypropyl acrylate, ethylene urea ethyl methacrylate, dicyclopentene ethoxy methacrylate, dimethylaminoethyl methacrylate, diethyl methacrylate amino ethyl ester, ethylene urea ethyl methacrylate, propylene methacrylate, dicyclopentene ethoxy methacrylate, tetrahydrofuryl methacrylate, and trifluoroethyl methacrylate;

third monomers, comprising 2-hydroxyethyl methacrylate, 2-hydroxypropyl methacrylate, methacrylate-2-hydroxyethyl ester, 2-hydroxypropyl methacrylate, glycidyl acrylate, glycidyl methacrylate, dimethylaminoethyl methacrylate, diethylaminoethyl methacrylate, vinyltrimethoxysilane, vinyltriethoxysilane, vinyl triisopropoxysilane, methacryloxypropyltrimethoxysilane, N-methylolacrylamide, N-butoxymethyl(meth) acrylamide, diacetoneacrylamide, ethyl methacrylate acetoacetate, divinylbenzene, epoxy resin with an epoxy value of 0.35-0.50, and divinylbenzene; and reactive dispersants, comprising polyvinyl alcohol, polypropylene alcohol, polypropylene glycol, polyethylene glycol, and polyvinyl acid alcohol.

24. The separator according to claim 18, wherein the second plasticizer comprises at least one of glycerol $C_4$-$C_{10}$ alkyl diether, glycerol $C_4$-$C_{10}$ alkyl ether, glycerol $C_4$-$C_{10}$ carboxylic acid monoester, glycerol $C_4$-$C_{10}$ carboxylic acid diester, propylene glycol $C_4$-$C_{10}$ alkyl ether, and glycerol.

25. The separator according to claim 1, wherein the pressure-sensitive coating further comprises organic particles, the organic particles comprising at least one of polytetrafluoroethylene particles, polychlorotrifluoroethylene particles, polyvinyl fluoride particles, polyvinylidene fluoride particles, polyethylene particles, polypropylene particles, polyacrylonitrile particles, polyethylene oxide particles, copolymer particles of fluorine-containing alkenyl monomer units and vinyl monomer units, copolymer particles of fluorine-containing alkenyl monomer units and acrylate monomer units, copolymer particles of fluorine-containing alkenyl monomer units and acrylic monomer units, and modified compound particles of the homopolymers or copolymers; and the organic particles and the composite particles form the bulges on the surface of the coating.

26. The separator according to claim 25, wherein the organic particles form a third agglomerate.

27. The separator according to claim 26, wherein $D_v50$ of the third agglomerate is 5 μm-30 μm, preferably 5.0 μm-12 μm.

28. The separator according to claim 25, wherein the third agglomerate comprises organic particles of primary particle morphology, and a gap is present between adjacent two of the organic particles.

29. The separator according to claim 28, wherein $D_v50$ of the organic particles of primary particle morphology is 50 nm-400 nm, preferably 100 nm-200 nm.

30. The separator according to claim 25, wherein mass ratio of the composite particles to the organic particles is (20-90):(0-70), preferably (45-90):(0-45).

31. The separator according to claim 1, wherein average thickness of the pressure-sensitive coating is 2 μm-20 μm, optionally 2 μm-15 μm.

32. A method for preparing the separator according to claim 1, comprising: forming a pressure-sensitive coating on at least a portion of surface of a substrate, wherein the pressure-sensitive coating comprises composite particles and a first plasticizer, the composite particles form bulges on surface of the pressure-sensitive coating, and the composite particles comprise polyacrylate particles and inorganic particles, wherein the inorganic particle is present between at least two of the polyacrylate particles, and solubility parameter of the first plasticizer and solubility parameter of the composite particles have a difference with an absolute value of 0.3 $MPa^{1/2}$-4 $MPa^{1/2}$.

33. A battery, comprising the separator according to claim 1.

34. An electric apparatus, comprising the battery according to claim 33, wherein the battery is configured to supply electrical energy.

* * * * *